US011823122B2

(12) United States Patent
Seals et al.

(10) Patent No.: US 11,823,122 B2
(45) Date of Patent: *Nov. 21, 2023

(54) FOOD DISPLAY SYSTEM INTEGRATING RETAILER SERVICES WITH CONSUMER ENGAGEMENT

(71) Applicant: Hussmann Corporation, Bridgeton, MO (US)

(72) Inventors: Michael Seals, Bridgeton, MO (US); Ramakrishna Krishnaswamy, St. Charles, MO (US); Norman Street, O'Fallon, MO (US); Daniel Schnur, Florissant, MO (US)

(73) Assignee: Hussmann Corporation, Bridgeton, MO (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/103,831

(22) Filed: Nov. 24, 2020

(65) Prior Publication Data

US 2021/0081885 A1 Mar. 18, 2021

Related U.S. Application Data

(63) Continuation of application No. 15/570,984, filed as application No. PCT/US2016/036533 on Jun. 8, 2016, now Pat. No. 10,846,653.

(Continued)

(51) Int. Cl.
*G06Q 10/00* (2023.01)
*G06Q 10/087* (2023.01)
(Continued)

(52) U.S. Cl.
CPC ......... *G06Q 10/087* (2013.01); *A47F 3/0434* (2013.01); *G06Q 10/20* (2013.01); *H04W 4/35* (2018.02); *G06Q 50/10* (2013.01)

(58) Field of Classification Search
CPC ...... G06Q 10/087; G06Q 10/20; G06Q 50/10; A47F 3/0434; H04W 4/35
(Continued)

(56) References Cited

U.S. PATENT DOCUMENTS 6,764,004 B2  7/2004  White
7,059,515 B2  6/2006  White
(Continued)

FOREIGN PATENT DOCUMENTS

CA      2345891 A1    11/2001
JP   2003217009 A      7/2003
(Continued)

OTHER PUBLICATIONS

International Search Report and Written Opinion for Application No. PCT/US2016/036533 dated Apr. 5, 2016, (9 pages).
(Continued)

*Primary Examiner* — Russell S Glass
(74) *Attorney, Agent, or Firm* — Michael Best & Friedrich LLP

(57) ABSTRACT

An equipment monitoring system for a merchandiser. The system includes a control system that defines a data acquisition node, a server that is in remote communication with the control system via a network providing a communication bridge between the data acquisition node and the server, and that includes a database and one or more applications having executable processing instructions, and equipment monitoring sensors that are coupled to one or more components of the merchandiser to obtain status data regarding the status of the one or more components. The equipment monitoring sensors are in communication with the data acquisition node to communicate the status data to the server. The application(s) execute processing instructions that conduct program analysis for the one or more components using the
(Continued)

status data based on information associated with the merchandiser to determine a predictive component failure associated with the one or more components.

16 Claims, 17 Drawing Sheets

Related U.S. Application Data

(60) Provisional application No. 62/172,543, filed on Jun. 8, 2015.

(51) Int. Cl.
- *G06Q 10/20* (2023.01)
- *H04W 4/35* (2018.01)
- *A47F 3/04* (2006.01)
- *G06Q 50/10* (2012.01)

(58) Field of Classification Search
USPC .......................................................... 705/28
See application file for complete search history.

(56) References Cited

U.S. PATENT DOCUMENTS

| | | | | |
|---|---|---|---|---|
| 7,295,119 | B2* | 11/2007 | Rappaport | H04L 43/00 |
| | | | | 705/28 |
| 8,504,397 | B2* | 8/2013 | Vempati | G06Q 10/063 |
| | | | | 705/28 |
| 2002/0183882 | A1* | 12/2002 | Dearing | G06Q 30/06 |
| | | | | 705/28 |
| 2003/0130913 | A1* | 7/2003 | Ehrman | G08G 1/127 |
| | | | | 705/28 |
| 2005/0125312 | A1* | 6/2005 | Dearing | G06K 7/10336 |
| | | | | 705/28 |
| 2005/0171738 | A1 | 8/2005 | Kadaba | |
| 2008/0097803 | A1 | 4/2008 | Chirnomas | |
| 2008/0140544 | A1* | 6/2008 | Ehrman | H04W 4/029 |
| | | | | 705/28 |
| 2009/0060349 | A1 | 3/2009 | Linaker et al. | |
| 2009/0306820 | A1 | 12/2009 | Simmons et al. | |
| 2010/0138037 | A1 | 6/2010 | Adelberg et al. | |
| 2011/0093306 | A1* | 4/2011 | Nielsen | G06Q 10/0631 |
| | | | | 705/28 |
| 2012/0215464 | A1 | 8/2012 | Daubney | |
| 2013/0211976 | A1* | 8/2013 | Breed | G06Q 10/06 |
| | | | | 705/28 |
| 2014/0279294 | A1* | 9/2014 | Field-Darragh | G06Q 30/0282 |
| | | | | 705/28 |
| 2014/0336791 | A1 | 11/2014 | Asenjo et al. | |

FOREIGN PATENT DOCUMENTS

| | | |
|---|---|---|
| KR | 1020080096620 A | 10/2008 |
| KR | 1020090119203 A | 11/2009 |
| KR | 1020140096216 A | 8/2014 |

OTHER PUBLICATIONS

International Preliminary Report on Patentability for Application No. PCT/US2016/036533 dated May 19, 2017 (17 pages).

New Zealand Patent Office Examination Report for Application No. 736965 dated Jul. 5, 2018 (4 pages).

New Zealand Patent Office Action for Application No. 736965 dated Apr. 29, 2019 (3 pages).

Zigsense, "Wireless Monitoring System for Cool Rooms, Freezers, Refrigerators, Laboratories, Hospitals, Supermarkets, Restaurants" publically available at least as early as Jul. 20, 2014 (8 pages).

Canadian Patent Office Examination Report for Application No. 2,988,769 dated Oct. 1, 2019 (6 pages).

European Patent Office Search Report and Search Opinion for Application No. 1 6808234.5 dated Sep. 25, 2018 (8 pages).

Canadian Patent Office Examination Report for Application No. 3,127,210 dated Aug. 30, 2023 (6 pages).

* cited by examiner

FOOD DISPLAY SYSTEM INTEGRATING RETAILER SERVICES WITH CONSUMER ENGAGEMENT

CROSS-REFERENCE TO RELATED APPLICATIONS

This application is a continuation of U.S. application Ser. No. 15/570,984, filed Oct. 31, 2017, and now U.S. Pat. No. 10,846,653, which is a national stage entry of PCT Application No. PCT/US2016/036533, filed Jun. 8, 2016, which claims priority to U.S. Provisional Patent Application No. 62/172,543, filed on Jun. 8, 2015, and entitled "Food Display System Integrating Retailer Services With Consumer Engagement," the contents of each of which is hereby incorporated by reference in its entirety.

BACKGROUND

The present invention relates to a food display system and, more specifically, to a system that integrates retailer services with consumer engagement.

Display systems in food retailing locations are generally known in the art. Generally, these systems are used by grocers, convenience stores, or other retailers of food items to store and display the food items.

While known display systems are effective at storing and displaying food items, this effectiveness requires a substantial investment of man-hours. Individuals are required to invest time to monitor inventory in the display system, and then when necessary, additional time to replenish the inventory in the display system.

Furthermore, additional man-hours must be invested to maintain display systems, especially systems that regulate temperature for fresh or frozen food items. Currently, maintenance on existing display systems and related equipment is reactive—maintenance is often only done after a problem has been identified. Reactive maintenance often results in lost revenue due to reduced display space and/or food spoilage. To the extent preventative maintenance is sought, it involves individuals investing significant time in systematic inspection, detection, identification, and correction of equipment issues prior to equipment failure.

Known food display systems also have limited engagement with shoppers and other consumers. For example, retailers attempt to engage with consumers by providing advertisements that notify consumers of sale items (e.g., through newspaper inserts, in-store flyers, email, or social media). These notifications may also include physical signs at or near display systems. However, after the consumer identifies and removes the food item(s) from the display system, the engagement between the consumer and the display system is complete.

SUMMARY OF THE INVENTION

The invention provides, in one aspect, a system to determine operation and maintenance monitoring, equipment optimization and life cycle management, inventory and supply chain management, and shopper engagement that includes a product display including a control system in communication with an inventory sensor and an equipment monitoring sensor, and a server in remote communication with the control system, the server containing a database and at least one application. The control system receives data from the inventory sensor and the equipment monitoring sensor, and communicates the data to the server for storage in the database, and at least one application accesses and analyzes the data stored in the database.

The invention provides, in another aspect, a method of determining preventative maintenance for a merchandiser that includes communicating data periodically from an equipment monitoring sensor on the merchandiser to a remote server, storing the data in a database on the server, analyzing the data in the database by a program to determine whether an equipment failure is predicted, generating electronic correspondence to an electronic device indicating a predicted equipment failure, a recommended repair or replacement, and providing an interactive scheduling selector, and sending the electronic correspondence to the electronic device.

The invention provides, in another aspect, a method of life cycle management of a merchandise that includes communicating data periodically from an equipment monitoring sensor on the merchandiser to a remote server, storing the data in a database on the server, analyzing the data in the database by a program to determine at least one of the amount of energy being consumed by the merchandiser, the total cost of ownership of the merchandiser, a sustainability metric, an option to reduce energy consumption, or an option to reduce the total cost of ownership, and communicating the results of the analyzing step to a recipient by an electronic device.

The invention provides, in another aspect, a method of supply chain management of a merchandiser that includes detecting a missing product in a shelf by an inventory sensor, confirming the existence of replenishing inventory of the missing product, determining the location of the replenishing inventory after successfully confirming the existence, and communicating the missing product in the shelf and the location of the replenishing inventory to a remote electronic device by an electronic communication.

The invention provides, in another aspect, a method of improving shopper engagement with a merchandiser in a retail environment that includes gathering purchasing preferences of a consumer, storing the purchasing preferences in an electronic database on a server, accessing the database to send communications to the consumer relating to the purchasing preferences by one of electronic communication or social media, detecting the presence of the consumer in the retail environment by a mobile device, generating a customized product promotion for the consumer by accessing the purchasing preferences stored in the database, detecting the consumer by the merchandiser communicating with the mobile device, and presenting the customized product promotion to the consumer through the merchandiser.

Other features and aspects of the invention will become apparent by consideration of the following detailed description and accompanying drawings.

Figure 1:
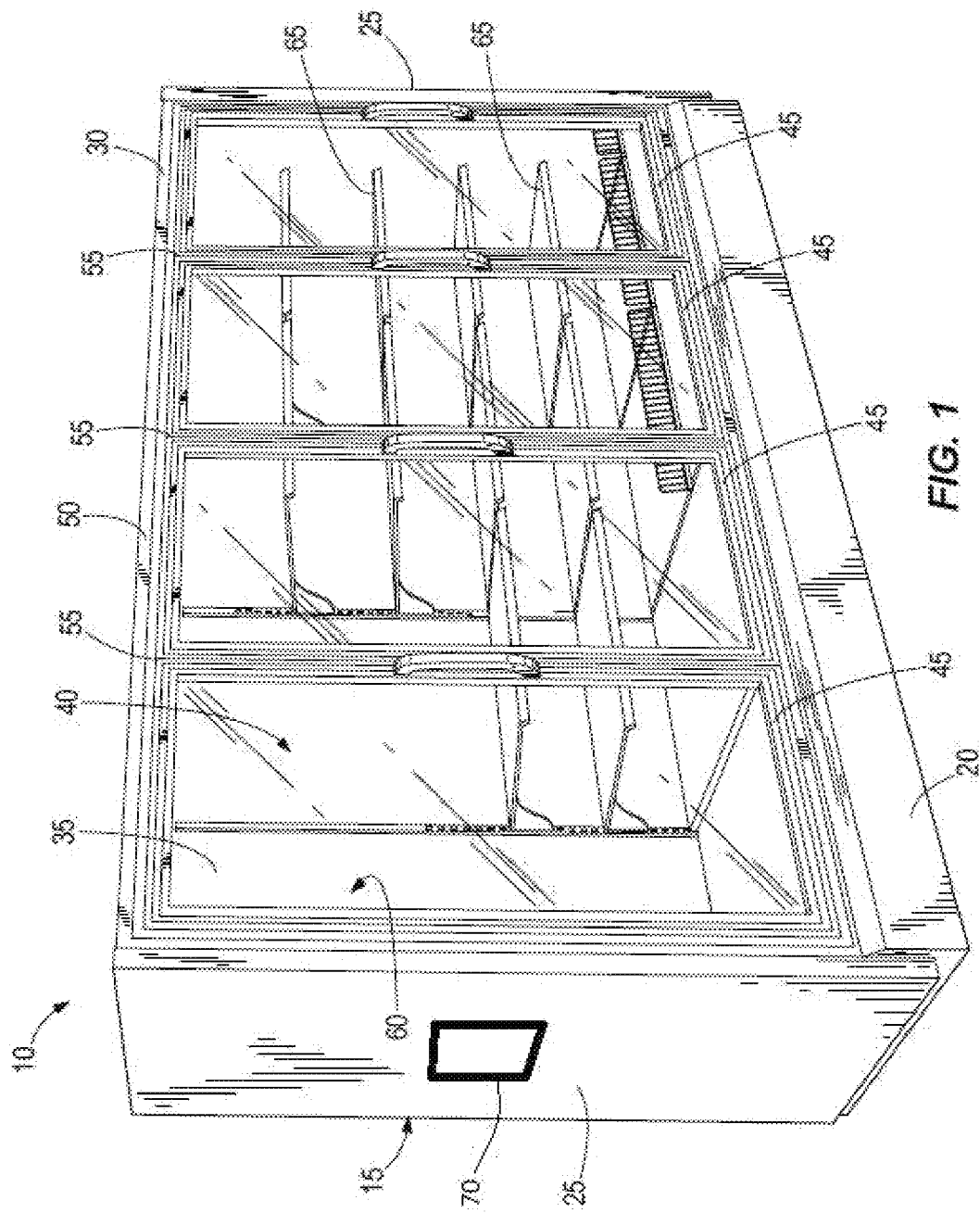
FIG. 1 is a perspective view of an exemplary display system, illustrated as a merchandiser, embodying aspects of the present invention.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

The invention illustrated in the Figures and disclosed herein is generally directed to one or more examples of a merchandiser 10 and associated system that implements one or more applications 92 to provide operations and maintenance monitoring, including a determination of preventative maintenance, equipment (or asset) optimization and life cycle management, inventory and supply chain management, and improved shopper engagement in a retail environment.

For ease of discussion and understanding, and for purposes of description only, the following detailed description will refer to a merchandiser 10. It should be appreciated that the term 'merchandiser' is provided as an example of a storage and display unit. The term merchandiser 10 may include any other suitable product display, product storage, product storage and display unit, or display system including, but not limited to, a display case, a self-service case, a shelf, any other suitable type of storage structure (e.g., in a storage room), or any suitable storage and/or display structure. The merchandiser 10 may be an open-front merchandiser, a reach-in refrigerator, a floral merchandiser, a wine merchandiser, a coffin-style merchandiser, a dual service merchandiser, or any other known or future developed refrigerated or non-refrigerated merchandiser or product storage and/or display for use with one or more applications 92, 150, 250, 350, 450 that are described in additional detail below. The merchandiser 10 can have any suitable storage and display unit orientation, for example a vertical orientation or a horizontally-oriented orientation. In addition, the merchandiser 10 can be an ambient-temperature merchandiser (e.g., an environment not having a temperature control), or the merchandiser 10 can include a temperature-controlled environment (e.g., product support or display area). The temperature-controlled environment can be a warm or hot environment, a medium temperature environment (e.g., between approximately 33-41 degrees Fahrenheit), or a low temperature environment (e.g., below approximately 32 degrees Fahrenheit). In addition, the merchandiser 10 may be configured to maintain any desired temperature or range of temperatures.

The following detailed description will refer to food, food product, food items, or product. These terms are provided as an example of products or items that may be displayed and stored in a merchandiser, and are presented for ease of discussion and understanding. It should be appreciated that the systems disclosed herein are not necessarily limited to food, food product, or food items. One or more aspects of the disclosed systems may be utilized with any product that is stored and/or displayed for access and purchase by a consumer. For example, product may include, but is not limited to, clothing or other dry goods, hardware, groceries, or any other tangible good.

FIG. 1 illustrates an exemplary merchandiser 10 in the form of a vertical refrigerated merchandiser. The merchandiser 10 includes a case 15 that has a base 20 and opposing sidewalls 25. The case 15 also includes a top or canopy 30 and a rear wall 35 positioned opposite an access opening 40. Although the illustrated merchandiser 10 includes a plurality of doors 45 covering the access opening 40, the merchandiser 10 can be an open-front merchandiser without doors. The doors 45 are mounted to a frame 50 that includes mullions 55 separating each of the doors 45. Doors 45 may be hinged or sliding doors. The case 15 defines a product support area 60 and has shelves 65 coupled to the rear wall 35 to support product in the product support area 60. The merchandiser 10 is illustrated as a singular case with one section and one product support area 60 defined by the section. As will be appreciated, the merchandiser can include one or more sections, with each section defining a product support area that makes up the overall product support area 60 of the merchandiser 10.

A control system 70 is connected to the merchandiser 10. In the illustrated embodiment, the control system 70 is attached to the sidewall 25, and can include a user interface (e.g., a display, a screen, a touchscreen, a stylus, a keyboard, etc.). In other embodiments, the control system 70 can be attached at any suitable location on the merchandiser 10 (e.g., on the top 30, etc.), proximate to the merchandiser 10, or at any suitable location in which the control system can be in communication with the merchandiser 10. The control system 70 may be removable from the merchandiser 10, and take the form of a tablet computer or other hand held computing device. In other embodiments, the control system 70 can be any suitable stationary or portable device (e.g., a computer, a laptop, a smartphone, etc.).

Figure 2:
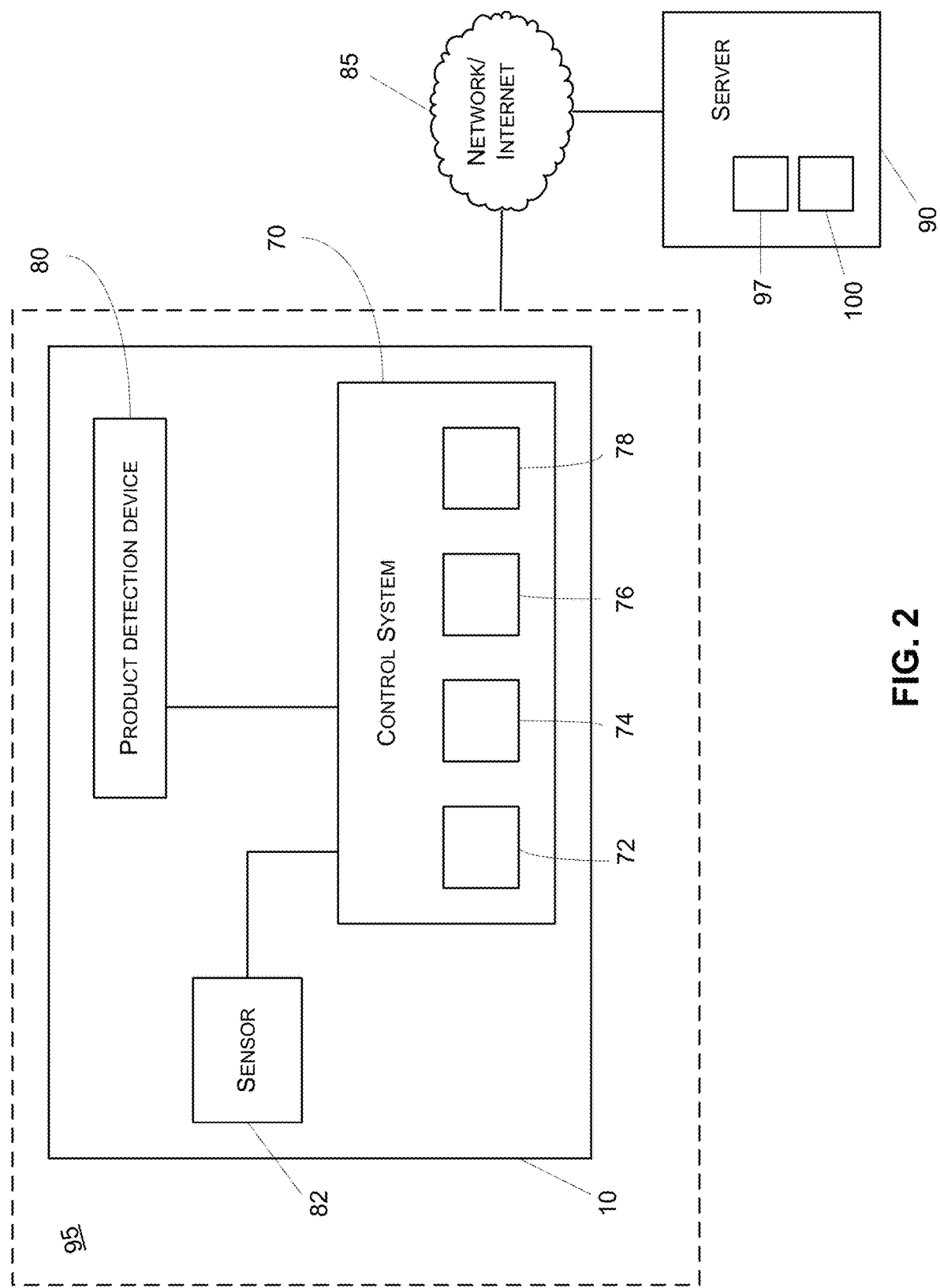
FIG. 2 is a schematic diagram illustrating a system embodying the present invention and including a retail environment having at least one merchandiser in communication with a database that is connected to a server.

Referring to FIG. 2, the control system 70 includes a programmable computer system including random access memory (RAM) 72, a computer readable storage medium or hard drive 74, at least one microprocessor 76, and a communication link 78. The communication link 78 facilitates communication with a product detection sensor or inventory sensor 80 and an equipment monitoring sensor 82 provided in the merchandiser 10, and a network 85 (e.g., LAN, WAN, Internet, cellular, wired or wireless or a combination of both, etc.). The communication between the communication link 78 and the inventory sensor 80, the equipment monitoring sensor 82, and the network 85 may be wired, wireless (e.g., a connection such as Bluetooth, ANT+, NFC, ZigBee, Z-Wave, etc.), or a combination of both.

The control system 70 is in communication with the inventory sensor 80 and the equipment monitoring sensor 82 provided in the merchandiser 10. The inventory sensor 80 may be any suitable device for detecting the presence or absence of product(s) in the merchandiser 10. The sensor 80 can include, but is not limited to, an infrared sensor, a camera, a video monitor, a weighted pad (e.g., an "out-of-stock sensor" marketed under the brand name POWER-SHELF, etc.), or any other suitable device for detection of product(s).

The equipment monitoring sensor 82 encompasses one or more sensors that monitor an aspect or aspects of one or more components of the merchandiser 10. The one or more components can include, but is not limited to, a motor, a compressor, a heat exchanger, a pump, a condenser, a refrigeration system, a heating system, one or more lights, a thermostat, a door, a door hinge, a fan assembly, etc. The equipment monitoring sensor 82 can include, but is not limited to, an accelerometer that measures vibration of a motor or other component, a door status switch that measures the number of times one or more doors 45 open or close, a temperature sensor, a pressure sensor, an electricity or power usage monitor that measures power consumption of the merchandiser 10 or one or more components thereof, or any other suitable device that measures or monitors at least one aspect of one or more components of the merchandiser 10.

Figure 3:
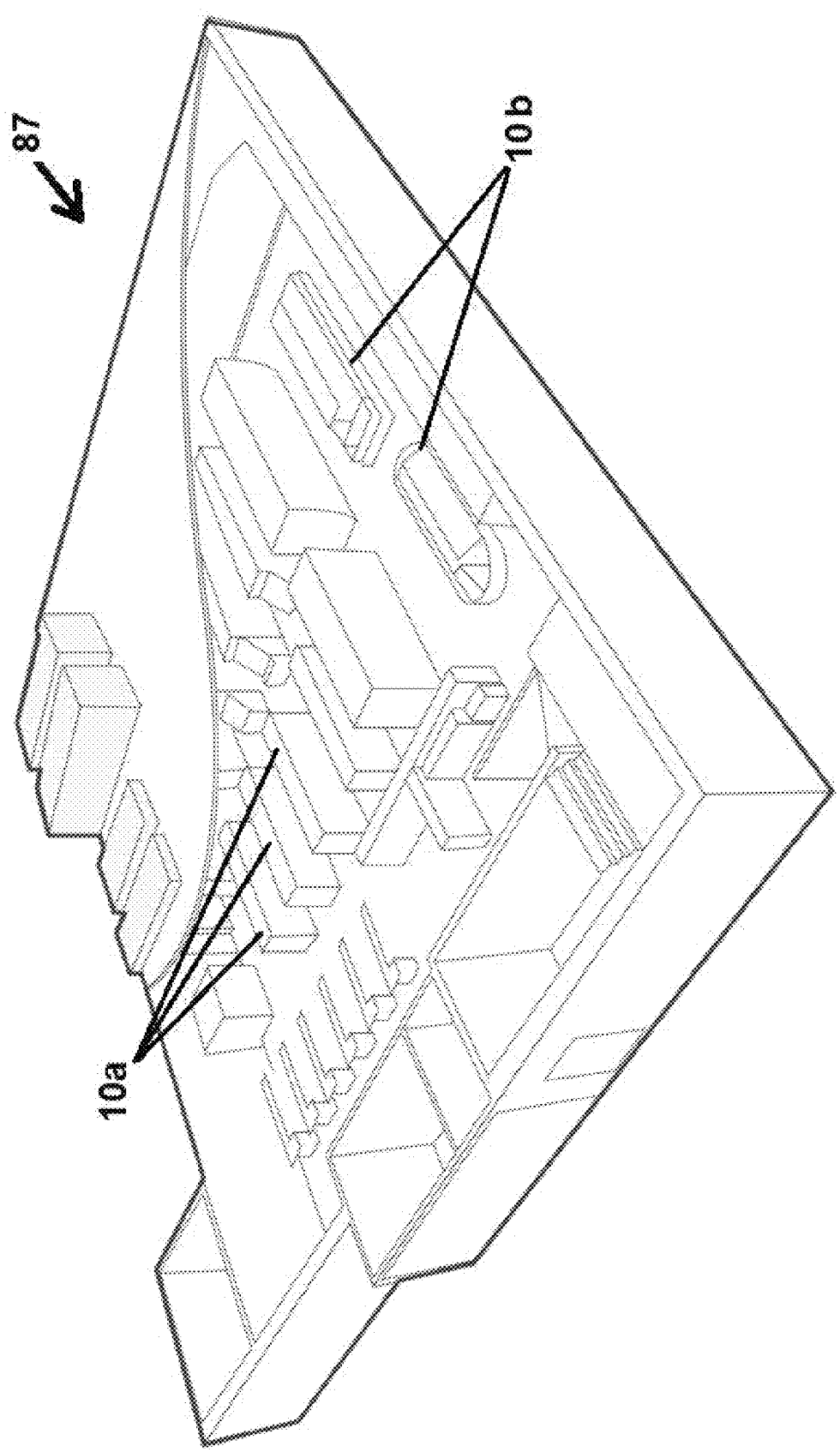
FIG. 3 is an isometric view of an example of the retail environment having a plurality of merchandisers arranged within the environment.

While the control system 70 is illustrated in FIG. 1 as being connected to a single merchandiser 10, in other embodiments a group of merchandisers 10 or a sub-set of merchandisers 10 may be connected to the control system 70. As illustrated in FIG. 3, an exemplary retail environment or setting 87, shown as a store 87, includes a plurality of merchandisers 10a arranged in aisles, and a plurality of merchandisers 10b arranged in islands. In the retail environment 87, the control system 70 may be in communication with one or more of a plurality of inventory sensors 80 and/or a plurality of equipment monitoring sensors 80 associated with respective merchandisers 10 in the group. Similarly, the control system 70 may be in communication with inventory sensor(s) 80 and/or equipment monitoring sensor(s) 82 respectively associated with the sub-set of merchandisers 10. Referring back to FIG. 2, the retail environment 87 is illustrated in broken lines because the environment 87 may take the form of any desired layout, and may include any number of merchandisers 10 arranged in any desired layout. For example, the merchandisers 10 (or a sub-set of the merchandisers 10) can be arranged throughout the retail environment 87 in any suitable layout, arrangement, or combination of arrangements.

As illustrated in FIG. 2, the network 85 is in communication with a server 89. The server 89 is preferably remote from the merchandiser 10, with the network 85 providing a communication bridge between the control system 70 and the server 89. The server 89 is a data storage system accessible through the network 85 (local) or the Internet 85 (cloud-based), and includes at least one database 90 and at least one application 92 (that includes a series of processing instructions or steps). Information is communication from the merchandiser 10 to the server 89, with portions of the information being stored by the database 90. The server 89 may be any suitable computing system, and can include, but is not limited to, a personal computer, a notebook computer, a server computer, a mainframe, a networked computer, a handheld computer, a workstation, and the like.

The merchandiser 10 may also include one or more light sources (not shown), graphical representations (not shown), indicia (not shown) or other aspects or features disclosed in one or more of U.S. patent application Ser. No. 14/301,264 (filed Jun. 10, 2014 and entitled "System and Method for Interaction with a Retail Environment"), U.S. patent application Ser. No. 14/301,262 (filed Jun. 10, 2014 and entitled "System and Method for Generating a Virtual Representation of a Retail Environment"), U.S. Pat. No. 8,164,274 (filed Jul. 20, 2007 and entitled "Product Display System, and Method for Illuminating a Product"), U.S. Pat. No. 8,684,268 (filed Apr. 24, 2012 and entitled "Product Display System, Profile Assembly for a Product Display System, and Method for Illuminating a Product"), U.S. patent application Ser. No. 13/874,781 (filed May 1, 2013 and entitled "Portable Device and Method for Product Lighting Control, Product Display Lighting Method and System, Method for Controlling Product Lighting, and Method for Setting Product Display Location Lighting"), U.S. patent application Ser. No. 12/125,734 (filed May 22, 2008 and entitled "Supply Chain Management System"), U.S. Pat. No. 6,764,004 (filed Apr. 4, 2003 and entitled "Logistics Chain Management System"), and U.S. Pat. No. 7,059,515 (filed Mar. 12, 2004 and entitled "Logistics Chain Management System"), each application being commonly assigned at the time of filing of this application, and the contents of each application being incorporated by reference in its entirety.

Figure 4:
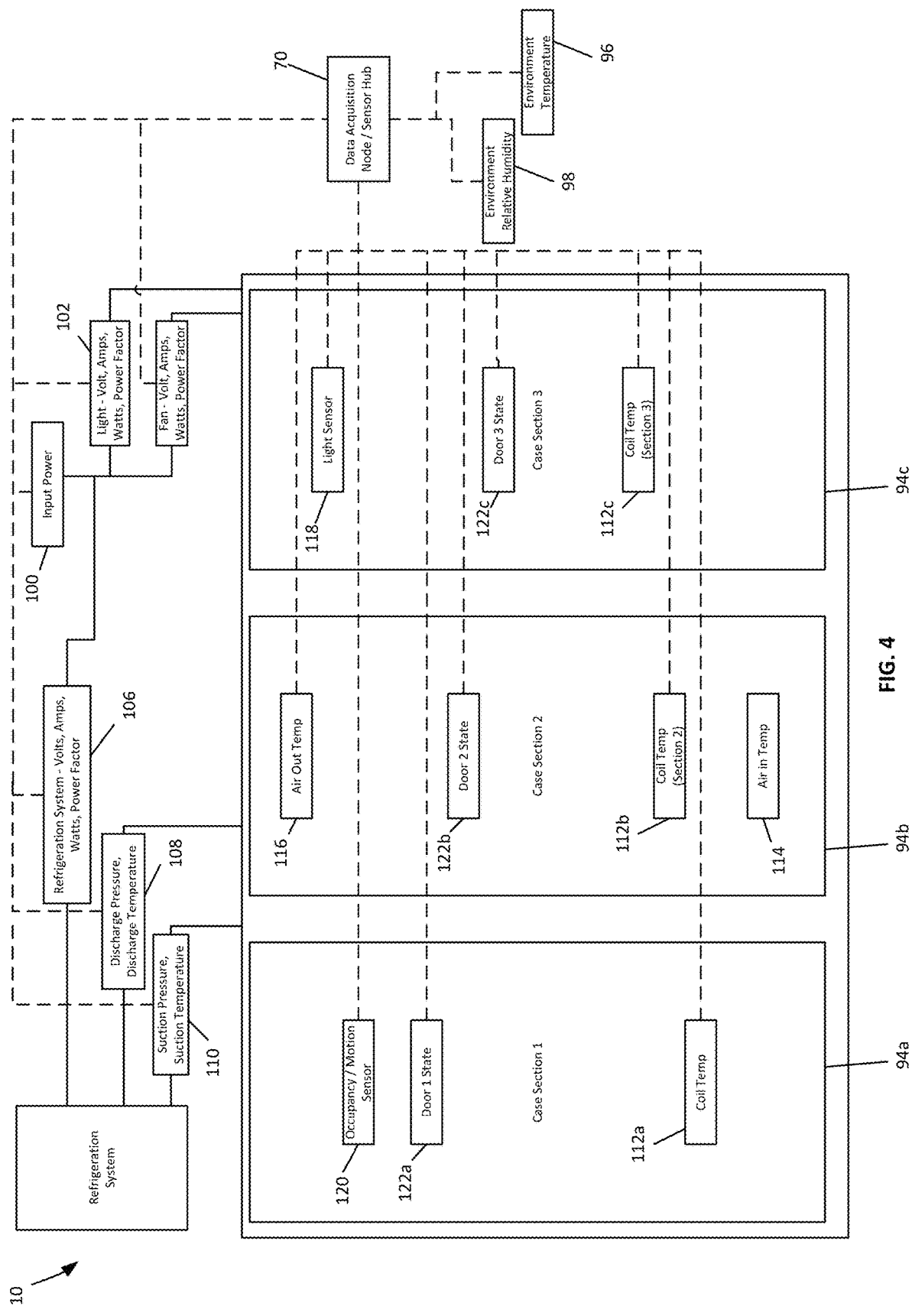
FIG. 4 is a schematic diagram of an embodiment of the display system of FIG. 1, illustrating a data acquisition node in communication with a plurality of sensors.

FIG. 4 is a flow diagram illustrating another embodiment of the merchandiser 10. In this embodiment, the merchandiser 10 includes a plurality of sections (or case sections) 94a, 94b, 94c (i.e., a first case section 94a, a second case section 94b, and a third case section 94c). Each section 94a, 94b, 94c is accessible by a respective door 45 (shown in FIG. 1). As illustrated, the control system 70 takes the form of a data acquisition node ("DAN") or sensor hub 70 that is mounted to a portion of the merchandiser 10. For purposes of the claims, the terms 'control system' 'data acquisition node', and 'sensor hub' are synonymous. The data acquisition node 70 is in communication with a plurality of equipment monitoring sensors 82 associated with the merchandiser 10. The data acquisition node 70 is configured to receive data (or information) from each of the plurality of equipment monitoring sensors 82 by communication lines (e.g., wired, wireless, etc.), which are illustrated in FIG. 4 by broken lines.

With reference to FIG. 4, the data acquisition node 70 is in communication with a temperature sensor 96 (e.g., a thermometer, etc.) that measures an ambient temperature of the retail environment 87, and a humidity sensor 98 (e.g., a hygrometer, etc.) that measures a relative humidity of the retail environment 87. The sensors 96, 98 respectively communicate temperature and humidity data measurements from the retail environment 87 to the data acquisition node 70.

The data acquisition node 70 is also in communication with one or more sensors that measure one or more aspects related to electricity (or electrical power) associated with one or more components of the merchandiser 10. The data acquisition node 70 is in communication with a sensor 100 (e.g., a load sensor, power analyzer, etc.) that measures an input electrical power or electrical load provided to the merchandiser 10.

The data acquisition node 70 is also in communication with one or more sensors 102 that measure electricity usage by a light (or lights or light assembly) that illuminates one or more areas in the merchandiser 10. The sensor(s) 102 can measure voltage, amperage, wattage, and/or a power factor used by the light (or lights or light assembly). Accordingly, the sensor(s) 102 can include, but is not limited to, a voltmeter, an ammeter, a wattmeter, and/or any other suitable sensor for measuring an aspect of electrical power, electrical usage, or electrical load provided to the light (or lights or light assembly).

In addition, the data acquisition node 70 is in communication with one or more sensors 104 that measure electricity usage by a fan (or fan assembly) that cycles refrigerated air through the merchandiser 10. The sensor(s) 104 can measure voltage, amperage, wattage, and/or a power factor associated with the fan (or fan assembly). Accordingly, the sensor(s) 104 can include, but is not limited to, a voltmeter, an ammeter, a wattmeter, and/or any other suitable sensor for measuring an aspect of electrical power, electrical usage, or electrical load provided to the fan (or fan assembly).

The data acquisition node 70 also is in communication with one or more sensors 106 that measure energy usage by the refrigeration system that cools air that is cycled through the merchandiser 10 (e.g., by a vapor-compression refrigeration cycle, etc.). The sensor(s) 106 can measure voltage, amperage, wattage, and/or a power factor associated with the fan (or fan assembly). Accordingly, the sensor(s) 106 can include, but is not limited to, a voltmeter, an ammeter, a wattmeter, and/or any other suitable sensor for measuring an aspect of electrical power, electrical usage, or electrical load provided to the refrigeration system. In other embodiments, the refrigeration system can be substituted with a heating system.

The illustrated data acquisition node 70 also can be in communication with pressure and temperature sensors positioned on a suction side and on a discharge side of the refrigeration system. More specifically, the data acquisition node 70 is in communication with one or more sensors 108 to measure a pressure (e.g., by a pressure gauge, etc.) and/or a temperature (e.g., by a thermometer, etc.) of refrigerant on the discharge side, and one or more sensors 110 to measure a pressure (e.g., by a pressure gauge, etc.) and/or a temperature (e.g., by a thermometer, etc.) of refrigerant on the suction side. In addition, the illustrated data acquisition node 70 is in communication with a temperature sensor 112 (e.g., a thermometer, etc.) that measures a temperature of refrigerant at a coil (e.g., an evaporator coil, a condenser coil, etc.). The illustrated merchandiser 10 includes three evaporator coils, with one coil associated with a corresponding case section 94, a, b, c. Accordingly, the data acquisition node 70 is in communication with three temperature sensors 112a, b, c. However, in other embodiments, the merchandiser can include a single coil/evaporator coil, or a plurality of coils/evaporator coils. In yet other embodiments, the coil can include any device interacting with air to cool (or heat) the air.

The illustrated data acquisition node 70 is further in communication with a temperature sensor 114 (e.g., a thermometer, etc.) that is configured to measure refrigerated air temperature where refrigerated air is enters the merchandiser 10 (i.e., an air inlet temperature), and a temperature sensor 116 (e.g., a thermometer, etc.) that is configured to measure refrigerated air temperature where refrigerated air exits the merchandiser 10 (i.e., an air outlet temperature).

The illustrated data acquisition node 70 also is in communication with a plurality of sensors related to user access of the merchandiser 10. More specifically, the data acquisition node 70 is in communication with a light sensor 118 that is configured to detect when a light (or lights or light assembly) positioned in the merchandiser 10 is on (or illuminated). In addition, the data acquisition node 70 is in communication with a motion sensor 120 (e.g., occupancy sensor) that is configured to detect movement or motion within (or near or proximate) the merchandiser 10. The data acquisition node 70 is also in communication with a door state sensor 122 that is configured to detect when a door 45 is open or closed. The illustrated merchandiser 10 includes three doors 45, with a door state sensor 122 associated with each door (e.g., a first door state sensor 122a, a second door state sensor 122b, a third door state sensor 122c). Generally, a door state sensor 122 is associated with each door 45 of the merchandiser 10.

For purposes of this disclosure, it should be appreciated that sensors 96, 98, 100, 102, 104, 106, 108, 110, 112, 114, 116, 118, 120, 122 can cumulatively be considered equipment monitoring sensors 82. In addition, the terms "measure" or "measures" can include measure, monitor, acquire, detecting, or any other term associated with data acquisition by a sensor.

The data acquisition node 70 receives data acquired from one or more of the sensors 96, 98, 100, 102, 104, 106, 108, 110, 112, 114, 116, 118, 120, 122. The data acquisition node 70 then communicates the data with the server 89 (e.g., by transmission generated by the data acquisition node 70, by a query generated by the server 89, by a query generated by the application 92, etc.). The data is then stored in the database 90 (see FIG. 2). It will be appreciated that the data acquisition node 70 can be in communication with other or additional sensors of the system.

Figure 5:
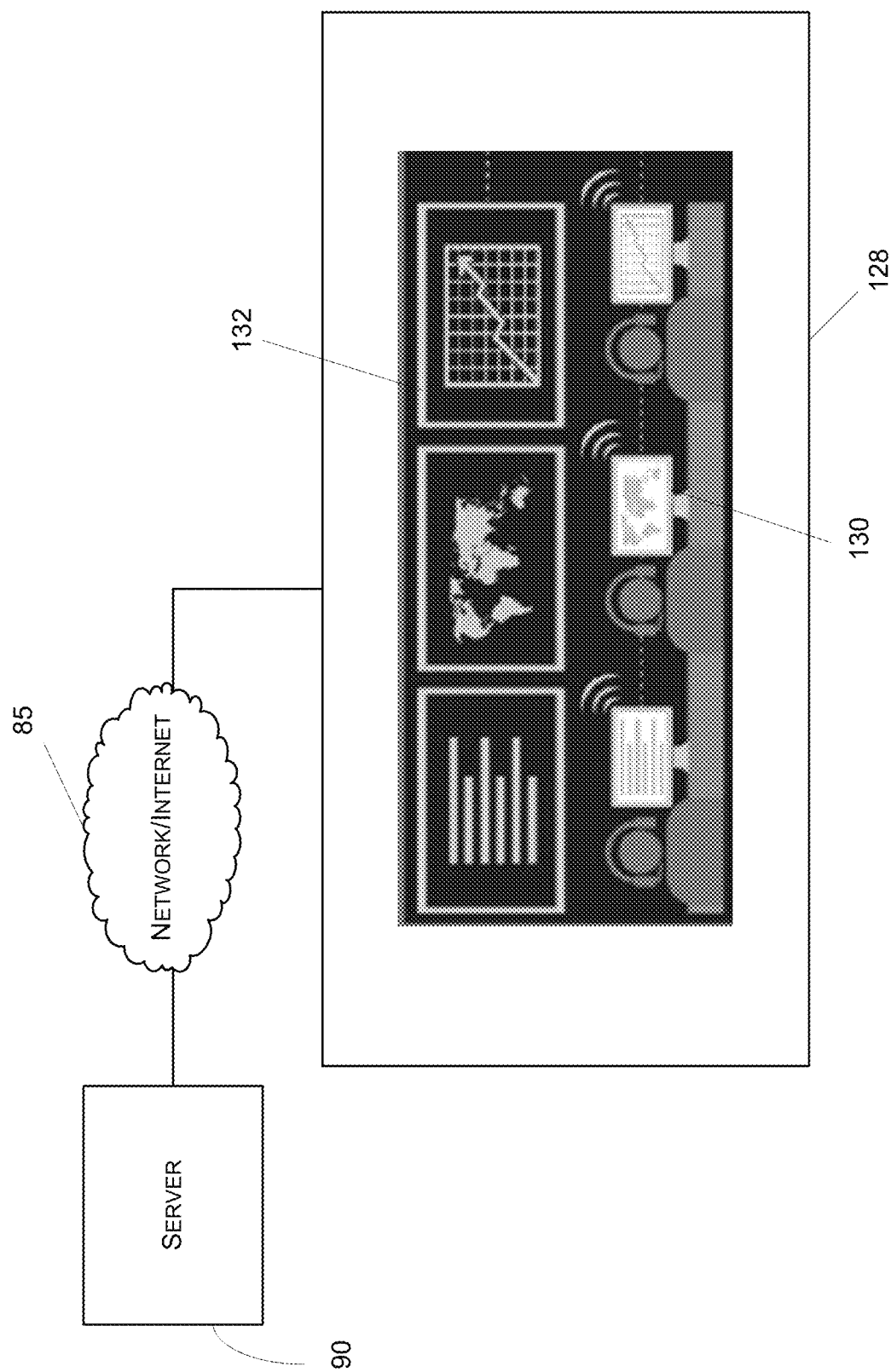
FIG. 5 is a schematic diagram illustrating a portion of the system of FIG. 2 and including a monitoring and managed services center that analyzes operations and maintenance information of the merchandiser.

Referring now to FIG. 5, a retail management center 128 is in communication with the server 89. The center 128 includes at least one programmable computer system 130 that is in communication with the server 89. The center 128 also includes a monitoring system 132 for actively monitoring at least one retail environment or store 87. The center 128 receives, analyzes, and otherwise utilizes the data transmitted by the merchandiser(s) 10 in the retail environment 87, and which is stored in the database 90 on the server 89. The monitoring system 132 can also be in communication with the application 92.

Figure 6:
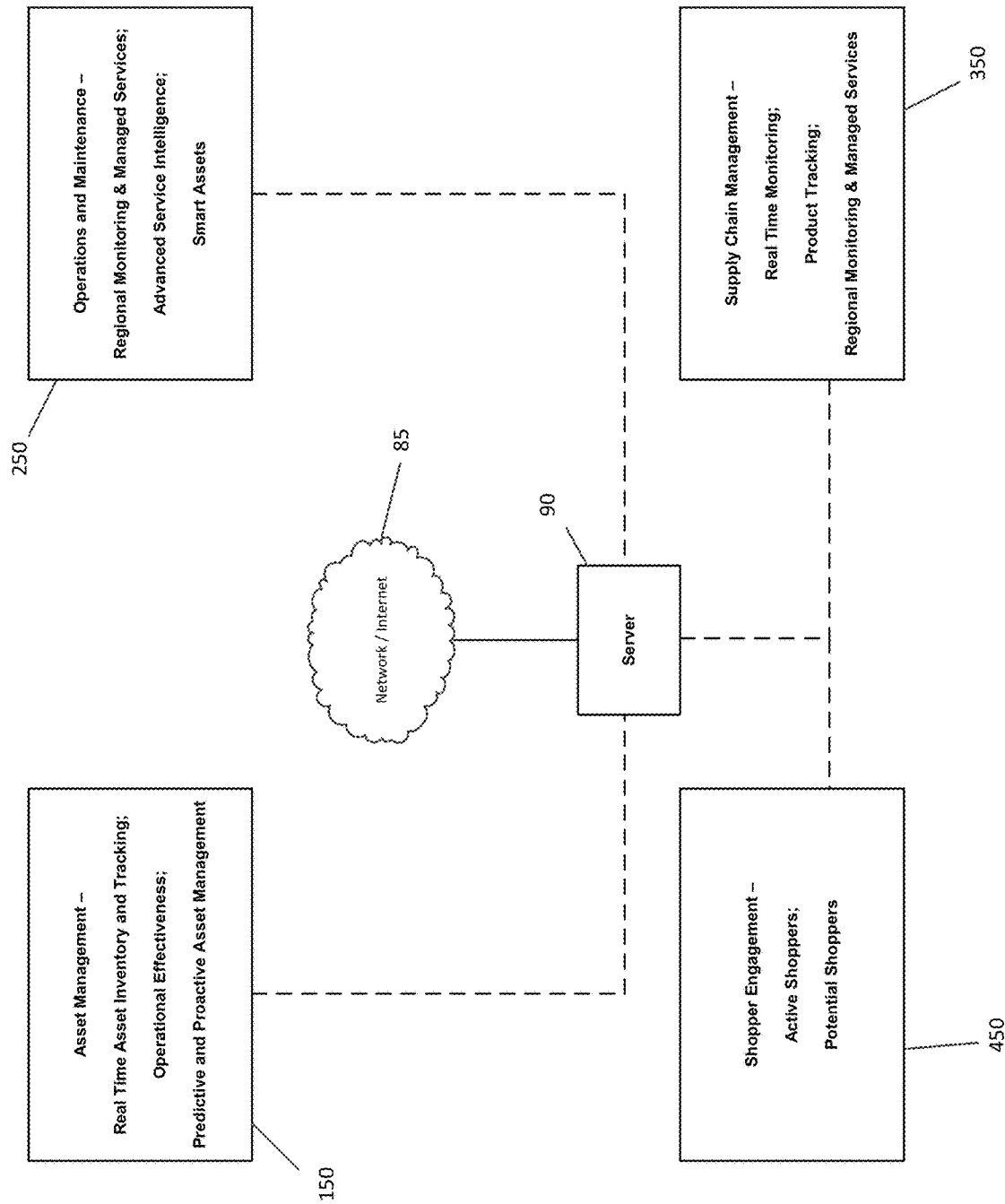
FIG. 6 is a depiction of the merchandiser and associated system that implements one or more applications.

FIG. 6 depicts an exemplary system that implements one or more system applications 92. The exemplary applications 92 illustrated in the system include an operation and maintenance application 150, an equipment optimization and life cycle management application 250, an inventory and supply chain management application 350, and a shopper engagement application 450. Each of the exemplary applications 92 will now be disclosed in additional detail.

Figure 7:
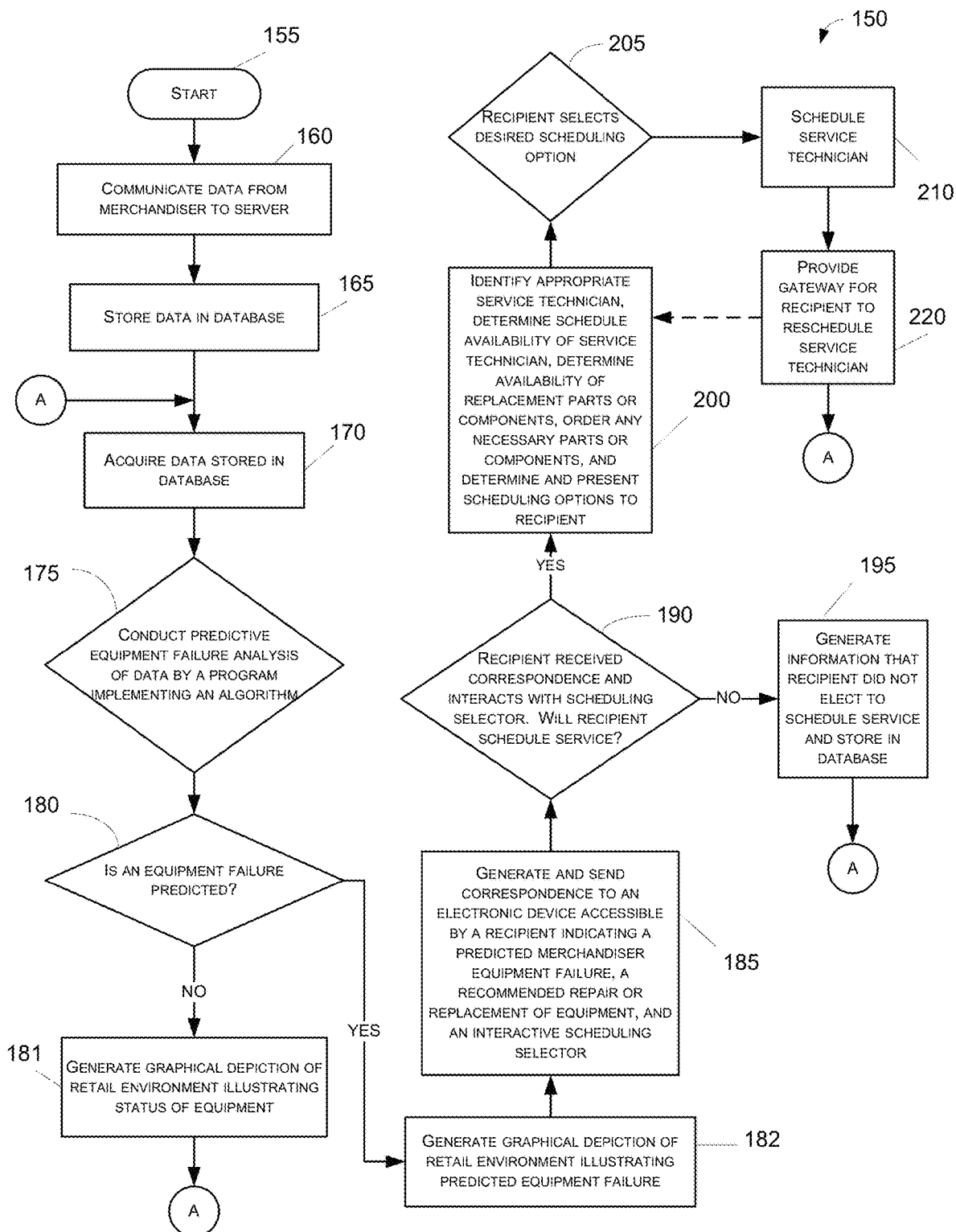
FIG. 7 is a flow chart illustrating an exemplary process for analyzing operations and maintenance of the merchandiser of FIG. 1.

FIG. 7 depicts an exemplary application 92 in the form of an operations and maintenance application 150 for analyzing operational and maintenance information associated with the retail environment 87, which includes one or more merchandiser(s) 10, to manage maintenance and determine a preventative maintenance process. It should be appreciated that the application 150 is also illustrated in a portion of FIG. 5. The application 150 includes a series of processing instructions or steps, which are depicted in a flow chart or a flow diagram form. The application 150 may be stored on the server 89 or on the computer system 130 of the monitoring and managed services center 128. The application 150 begins at step 155, where the merchandiser 10 is in communication with the server 89, and at least one equipment monitoring sensor 82 associated with the merchandiser 10 is operating and periodically collecting data associated with the merchandiser 10 or components thereof.

Next, at step 160, the control system 70 acquires and communicates data acquired from the equipment monitoring sensor(s) 82 to the database 90. This data and other information (e.g., store name, store location, city, state, etc.) are stored in the database 90 at step 165. Examples of the data communicated by the merchandiser 10 and stored in the database 90 can include, but is not limited to, vibration information acquired at intervals from an accelerometer associated with a motor or other component of the merchandiser 10, the counter or other data associated with the door opening switch that measures the number of times one or more doors 45 open, and the electricity usage information collected by the electricity usage monitor that measures power consumption of the merchandiser 10 or one or more components thereof. The data can also include additional information, such as chronological information (e.g., time and date of data acquisition), equipment or component identification information, merchandiser 10 identification information, merchandiser 10 location within the retail environment 87 information, and retail environment 87 identification information (e.g., store name, store location, city, state, etc.).

At step 170, the application 150 communicates with the database 90 to acquire the stored equipment monitoring sensor(s) data. The data acquired may be any desired portion or sub-set of the data in the database 90, up to and including the entirety of the data. Next, at step 175, the application 150 conducts a predictive equipment failure analysis by executing a program or computer-enabled instructions (e.g., instructions implemented on a processor). The instructions can include stream analytics and machine learning relative to those streams to capture real time and historical performance of the merchandiser 10 based on the data. In the analysis, the program gathers, manipulates, conducts calculations, and analyzes the data to ascertain and predict a risk of failure based on certain known information. For example, program analysis can include conducting calculations on the vibration information acquired by the accelerometer (e.g., moving averages, trends, etc.), and analyzing the results of the calculations against data indicative of anticipated failure (e.g., vibration levels indicating anticipated equipment failure). As another example, the program analysis can include conducting calculations on the counter or other data associated with the door opening switch that measures the number of times one or more doors 45 are opened, and analyzing the results of the calculations against known data indicative of anticipated failure (e.g., a total number of openings indicative of anticipated door 45, door hinge failure, etc.). In another example, the program analysis can include conducting calculations on the electricity usage information collected by the electricity usage monitor that measures power consumption of the merchandiser 10 or one or more components thereof, and analyzing the results of the calculations against known data indicative of anticipated failure (e.g., electricity load or consumption levels indicative of an equipment failure).

Figure 10:
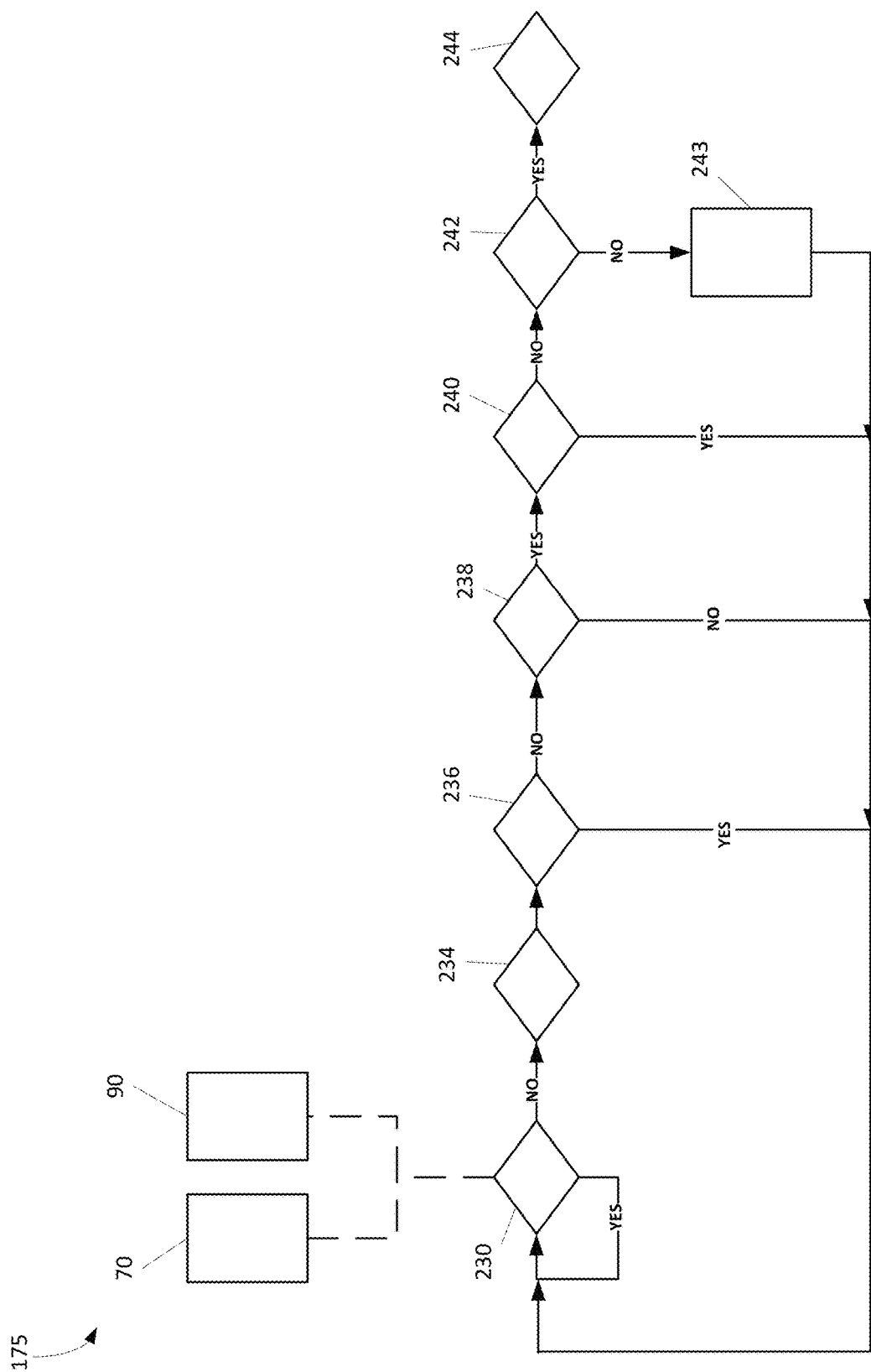
FIG. 10 is a flow chart illustrating an exemplary predictive equipment failure analysis performed by the process for analyzing operations and maintenance of the merchandiser in FIG. 7.

In another example, the program analysis can include monitoring one or more of the equipment monitoring sensors 82 associated with the merchandiser 10. If or when one (or more) of the equipment monitoring sensors 82 is detected in an out of limit condition (e.g., outside of a pre-set limit or set point, which can include above or below the limit or set point, etc.), the program analysis can analyze other equipment monitoring sensors 82 to determine whether the out of limit condition is due to normal use, or a potential equipment failure or an existing equipment failure. An exemplary program analysis is illustrated in FIG. 10, which is discussed in additional detail below.

At step 180, the application 150 makes a determination whether an equipment failure is anticipated or predicted. If the application 150 does not make such a determination (i.e. "No" at step 180), the application 150 can generate a graphical depiction of the retail environment 87 that illustrates a status of the merchandiser(s) 10 and associated equipment. The application 150 then returns to step 170 for additional data acquisition and analysis. The additional analysis can be conducted in real time, near-real time, or at periodic intervals.

If the application 150 does make a determination that an equipment failure is predicted (i.e. "Yes" at step 180), the application 150 moves to step 182 and generates a graphical depiction of the retail environment 87 illustrating a status of the merchandiser(s) 10 and associated equipment.

Figure 8:
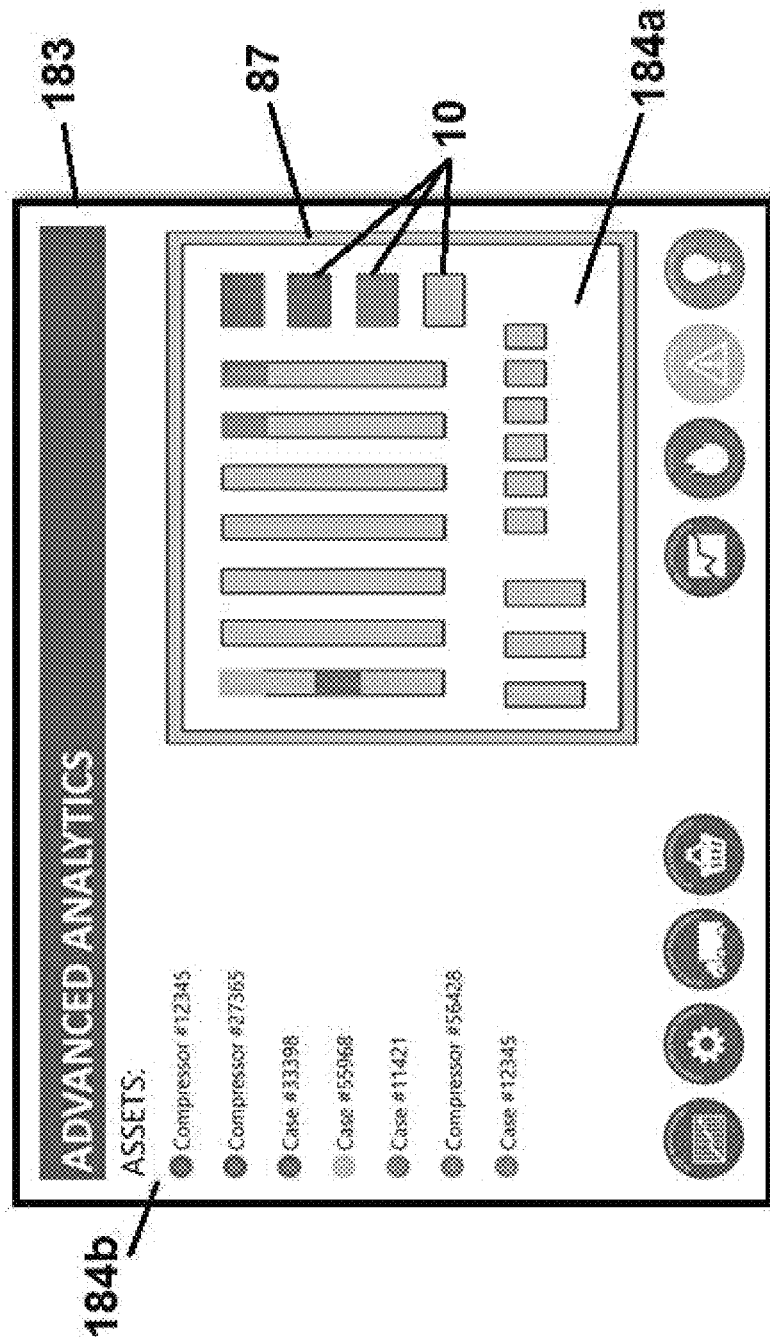
FIG. 8 is an example of a graphical depiction of the retail environment generated by the exemplary process illustrated in FIG. 7.

FIG. 8 illustrates an exemplary graphical depiction of the retail environment 87 referenced in step 182. The depiction 183 illustrates the arrangement of merchandiser(s) 10 in the retail environment 87, and predicted maintenance statuses. In the illustrated example, the graphical depiction 183 includes a floor plan 184a of the retail environment 87 that shows the arrangement of merchandisers 10 and that graphically depicts the predicted maintenance statuses with color codes (e.g., "red" indicating a predicted equipment failure, "yellow" indicating a potential item of concern, and "green" indicating no issue or concern), and a list of specific items being monitored 184b associated with the color coding. The item(s) monitored can include any item related to the device or equipment or functionality being monitored. The graphical depiction 183 can be electronically accessed by or sent to the retail management center 128. The graphical depiction generated in step 181 can be substantially the same as the graphical depiction generated in step 182 (and illustrated as depiction 183 in FIG. 8), however the depiction generated in step 181 likely will not include equipment having a coding indicating a predicted equipment failure.

Referring back to FIG. 7, next at step 185 the application 150 generates and sends correspondence to an electronic device that is accessible by a recipient. The recipient may include, but is not limited to, an owner, a user, or any other person, party, or group that is responsible for the merchandiser 10 at the retail environment or store 87. The correspondence may be an email, hyperlink to a website, an application, or other electronic correspondence that provides information of the predicted equipment failure, a recommendation for repair or replacement, and an interactive scheduling selector or tool to confirm whether the recipient desires service for repair or replacement of the equipment (e.g., a first icon that states "press here to schedule service" and a second icon that states "press here to not schedule service.").

At step 190, the recipient receives the correspondence and interacts with the interactive scheduling selector. If the recipient interacts with the selector and chooses not to schedule service on the equipment (e.g., "No" at step 190), the process 150 proceeds to step 195 and generates information indicating the correspondence was sent to the appropriate recipient, the recipient did not elect schedule service, stores the information in the database 90, and returns to step 170 for additional data acquisition and analysis.

If the recipient interacts with the selector and chooses to schedule service on the equipment (e.g., "Yes" at step 190), the process 150 proceeds to step 200, where the process identifies an appropriate service technician (e.g., based on geography, technical expertise, availability, etc.), determines the schedule availability of the appropriate service technician, determines the availability of appropriate replacement parts or components (e.g., whether appropriate replacement parts or components are available in a storage facility in the geographic area), and if the replacement parts or components are unavailable, places an order for the appropriate replacement parts or components. Based on the availability of the appropriate service technician, the technician's schedule, and availability of the replacement part or components, the process 150 determines and presents one or more scheduling options to the recipient.

Figure 9:
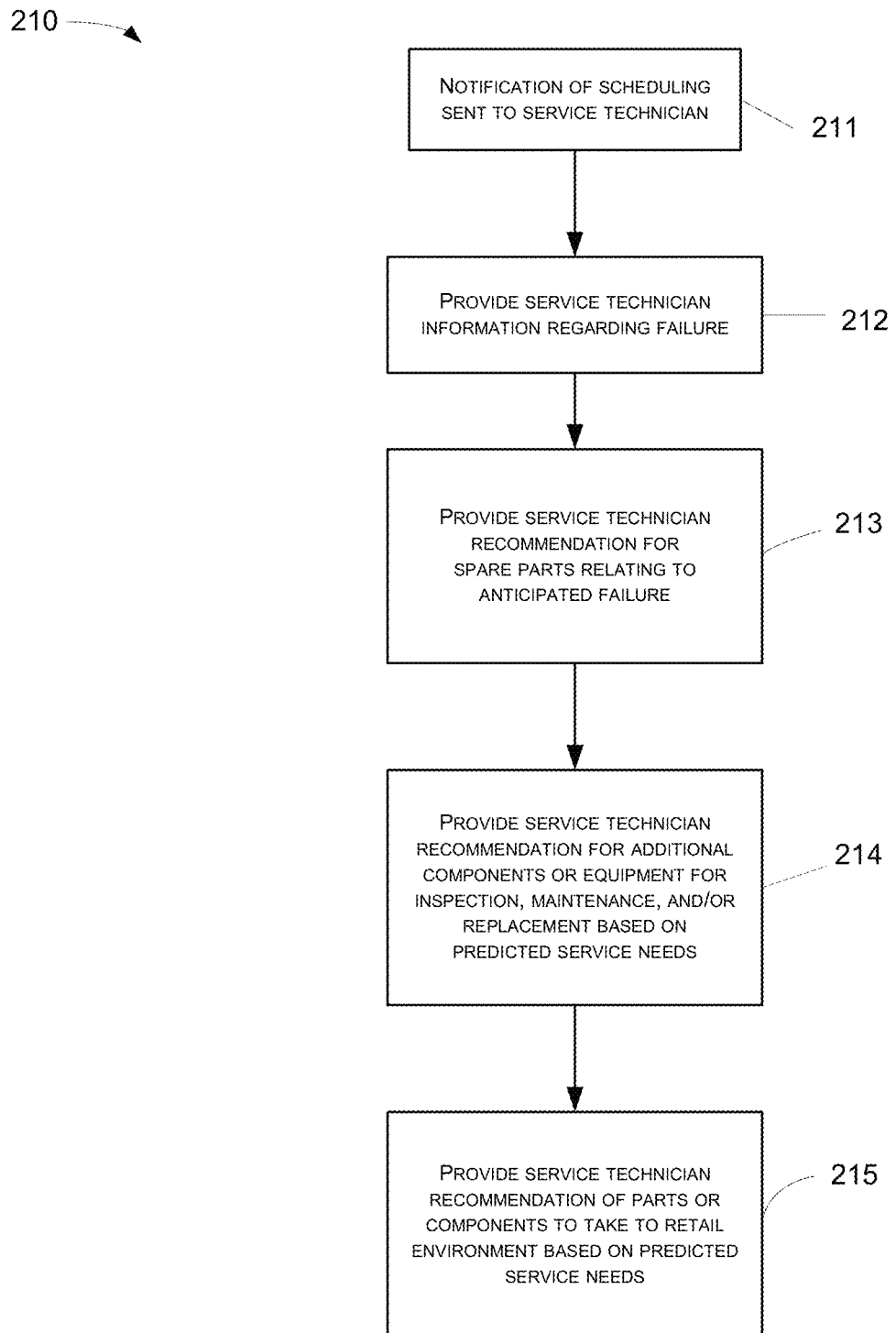
FIG. 9 is a flow chart further illustrating aspects of the real-time notification to a service technician during the scheduling process depicted in FIG. 7.

At step 205, the recipient selects the desired scheduling option. The process 150 proceeds to step 210, where the service technician is scheduled for the selected service (e.g., the service technician receives notification of the scheduled service). Referring to FIG. 9, the service technician scheduling step at 210 is a near real-time or real-time notification to the service technician that can include one or more notifications. At step 211, the process sends a first notification to the service technician indicating the scheduling of the selected service. The notification can include information relating to the time and date of the scheduled service, and the location of the scheduled service (e.g., the trade or common name of the retail environment, a street address, a city/state, a map, entrance instructions, etc.). The notification can be sent by electronic communication to the service technician, for example by email or text message. In addition, the notification can include a confirmation feature whereby the process generates an indication that the notification was received and confirmed by the service technician. For example, the notification may include an interactive selector or tool for to confirm receipt by the service technician (e.g., an icon that states "please press here to confirm receipt of scheduled service"). In other embodiments, the notification may include an embedded or automatic notification that verifies receipt and/or confirmation by the service technician (e.g., a read receipt or other receipt that triggers once the notification is accessed, such as by opening of the email or other electronic confirmation).

Next, at step 212, the process 150 can provide information to the service technician regarding the predicted or known failure. The information can include an indication of one or more components that have a predicted failure (or are likely to fail or are anticipated to fail or have failed). In addition, the information can include an order (or hierarchy) for evaluating one or more of the components for failure.

At step 213, the process 150 can present a recommendation of spare parts to the service technician relating to the predicted failure. The spare parts recommendation can include components, parts, tools, or any other related materials associated with the anticipated failure.

Next, at step 214, the process 150 can present a recommendation of additional components and/or equipment for inspection, maintenance, and/or replacement. The recommendation can be listing of one or more components and/or equipment, and can be related to preventative maintenance. The recommendation can be generated based on predictive service needs, for example based on trends generated from analysis of data from one or more sensors 82, from operational limits (e.g., recommended number of operational hours before anticipated failure, etc.), or other analytics based, entirely or in-part, on analysis of data from one or more sensors 82, etc.

At step 215, the process 150 can present a recommendation of spare parts to the service technician relating to the recommendation of additional components and/or equipment for inspection, maintenance, and/or replacement. The spare parts recommendation can include components, parts, tools, or any other related materials associated with each of the components and/or equipment identified for recommended inspection, maintenance, and/or replacement.

Steps 212-215 advantageously improve efficiency of the service technician during a service trip, as in addition to necessary and/or required repairs, the service technician can address preventative maintenance concerns. The recommendation for spare parts can also improve efficiency of the service technician during a service trip, as the service technician can be prepared for actual and/or potential repairs, minimizing lost repair time due to travel to acquire alternative spare parts.

It should be appreciated that one or more of the notifications and/or recommendations provided to the service technician in steps 212 to 215 can be sent in the notification generated in step 211, in a separate, second notification that can be generated after confirmation of receipt by the service technician in step 211, via a gateway accessible by the service technician (e.g., a hyperlink or other electronic access, etc.), or in any other suitable notification system (e.g., by a web-based communication portal, text message, email, etc.).

After scheduling of the service technician, the process 150 can provide a gateway for the recipient to reschedule the service technician at step 220. For example, the process 150 may provide a hyperlink or other electronic connection to provide the recipient access to return to step 200 (shown in broken lines) to receive and then select another desired scheduling option. The process 150 then returns to step 170 for additional data acquisition and analysis.

FIG. 10 illustrates an embodiment of the predictive equipment failure analysis performed at step 175. The predictive equipment failure analysis monitors one or more of the equipment monitoring sensors 82, and in response to a detected out of limit condition, analyzes the data acquired by the one or more of the equipment monitoring sensors 82 to remotely determine a probably root cause of the out of limit condition.

At step 230, the predictive equipment failure analysis 175 is monitoring one or more of the equipment monitoring sensors 82 (e.g., one or more of the sensors 96, 98, 100, 102, 104, 106, 108, 110, 112, 114, 116, 118, 120, 122, etc.). The program or computer-enabled instructions (e.g., instructions implemented on a processor, or processing steps, etc.) is in communication with the acquisition node 70 and the database 90 to access data generated by one or more of the equipment monitoring sensors 82. This data is analyzed comparatively against a pre-set limit or set point for each monitored sensor 82. The limit or set point can include a data point or a range (e.g., a high limit and a low limit). If the analysis determines that the monitored sensor 82 is within the limit or set point (i.e., the answer is "yes"), the process continues to monitor the sensor 82. If the analysis determines that the monitored sensor 82 is within the limit or set point, for example the data from the monitored sensor 82 is above a high limit or below a low limit, (i.e., the answer is "no"), the process moves to step 234.

At step 234, the analysis 175 evaluates (or analyzes) one or more additional sensors 82 to perform a remote root cause analysis. The root cause analysis reduces false alarms, while also determines a root cause for generation of the out of limit condition. The root cause analysis 234 is illustrated in association with a high discharge temperature alarm, resulting from detection of an out of limit condition of the discharge air temperature sensor 116 (shown in FIG. 4). However, the root cause analysis 234 is not limited to analyzing the out of limit condition of the discharge air temperature sensor 116, as the root cause analysis 234 can be applicable to any out of limit condition associated with any of the equipment monitoring sensors 82. In addition, at step 234, a timer can initiate. The timer tracks the length of time of the out of limit condition.

Next, at step 236, the analysis analyzes a first sensor (or a first operational condition), and more specifically the door state sensor(s) 122 (shown in FIG. 4). The analysis is evaluating whether one of the door(s) 45 associated with the merchandiser 10 is in an open configuration or position. If one of the door state sensors 122 detects the associated door 45 in an open position (i.e., the answer is "yes"), the analysis returns to step 230 and repeats, as the out of limit condition of the discharge air temperature sensor 116 is likely caused by one (or more) of the doors 45 being open. If one of the door state sensors 122 does not detect the associated door 45 in an open position (i.e., the answer is "no"), the analysis proceeds to step 238.

At step 238, the analysis analyzes a second sensor (or a second operational condition), and more specifically the fan (or fan assembly) to determine whether the fan is operational. If the analysis determines that the fan is not operational (i.e., the answer is "no"), the analysis returns to step 230 and repeats, as the merchandiser 10 will initiate operation of the fan to lower the discharge air temperature in association with normal operation. If the analysis determines that the fan is operational (i.e., the answer is "yes"), the analysis proceeds to step 240.

Next, at step 240 the analysis analyzes a third sensor (or a third operational condition), and more specifically the operational condition that the merchandiser 10 can be in a defrost operational mode. If the analysis determines that the defrost mode of the merchandiser 10 is operational (i.e., the answer is "yes"), which can result in an increase in discharge air temperature, the analysis returns to step 230 and repeats. If the analysis determines that the defrost mode of the merchandiser 10 is not operational (i.e., the answer is "no"), the analysis proceeds to step 242.

At step 242, the analysis analyzes a fourth sensor (or a fourth operational condition), and more specifically whether a time limit of the timer that began at step 234 has been exceeded. If the time limit of the timer has not been exceeded, and the out of limit condition is no longer detected (e.g., the discharge air temperature sensor 116 is no longer outside of the limit or set point, etc.) (i.e., the answer is "no"), the accrued time of the out of limit condition is stored in the database 90 for later analysis or use at step 243 (e.g., to update baseline operational characteristics of the merchandiser 10 to improve analysis accuracy, etc.) before the analysis returns to step 230 and repeats. If the limit of the timer has exceeded, and the out of limit condition is still detected (i.e., the answer is "yes"), the analysis proceeds to step 244, where an alarm is activates (e.g., a discharge air threshold alarm, etc.) and an equipment failure is predicted.

Figure 11:
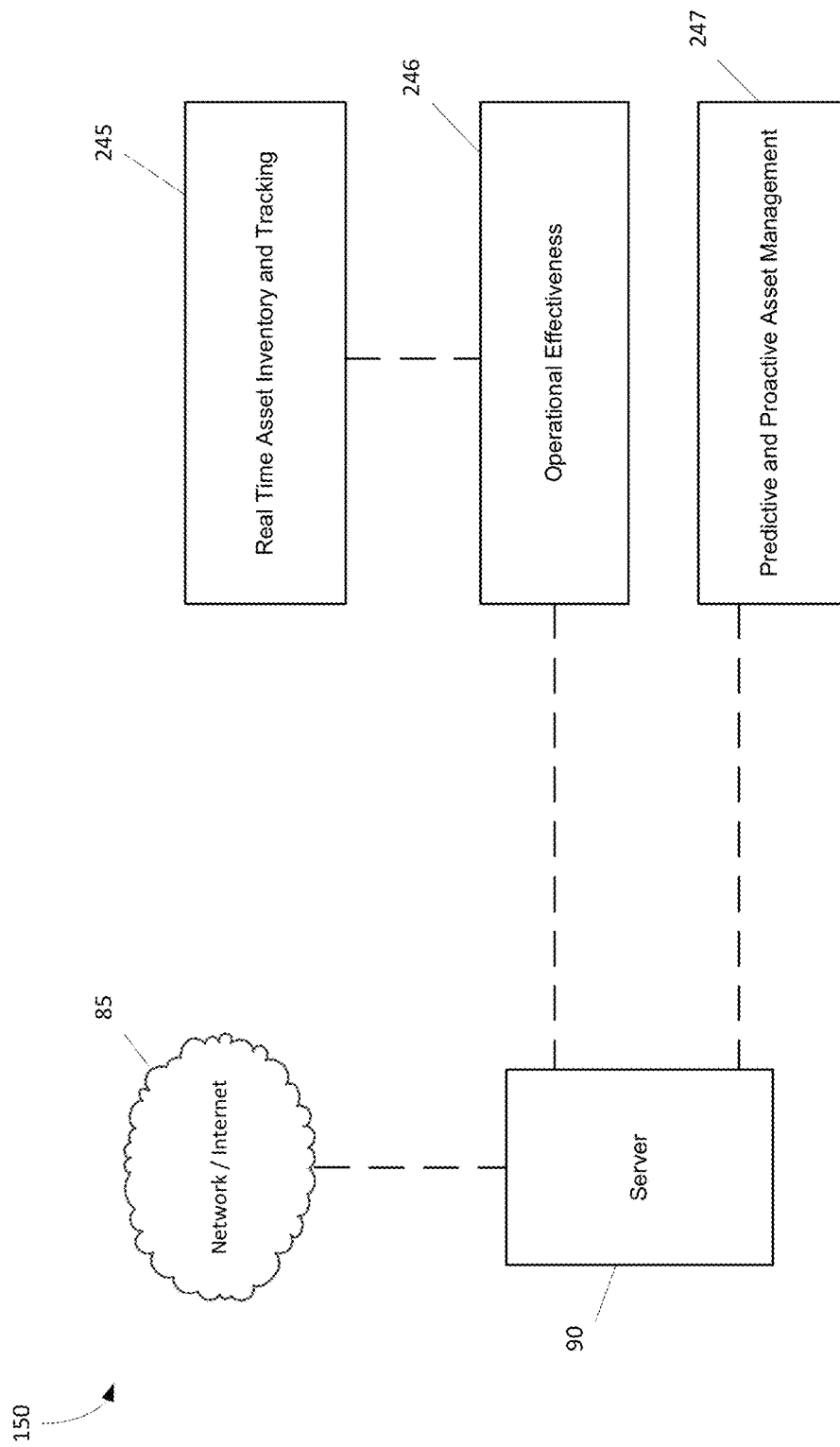
FIG. 11 is a flow chart of aspects of the process of FIG. 7.

FIG. 11 illustrates other examples of the asset management aspect of the process 150, which includes lifecycle management and asset optimization, shown in a flow chart format. The operations and maintenance includes a real time asset inventory and tracking portion 245 that is in communication with an operational effectiveness portion 246, and a predictive and proactive asset management portion 247. Each portion 245, 246, 247 is in communication with the network or Internet 85 and the database 90. The real time asset inventory and tracking portion 245 tracks historical equipment, service, and performance data relating to both in-service merchandisers 10 and out-of-service merchandisers 10. This information facilitates improved management of the merchandisers 10, as it provides for informed decisions relating to merchandiser 10 maintenance and/or replacement. The portion 245 can also provide merchandiser 10 data in association with consumer presence, consumer travel patterns, and inventory to provide information that can be used for store level improvements (e.g., replacement or repositioning of merchandisers 10, etc.). The operational effectiveness portion 246 provides information relating to merchandisers 10 in the retail environment 87 to improve operational performance, refrigerant management, energy consumption, and return on investment of the merchandisers 10. The predictive and proactive asset management portion 247 can improve inventory management, store layout, and product placement to improve store level profitability. In addition, the proactive and preventative maintenance programs reduce the cost of operations and maintenance services. The asset management aspect of the process 150 advantageously leverages operational data, including operations, supply chain, and engagement data to provide real-time insight. Further, the aspect improves gross revenue by allowing for data driven merchandiser 10 configurations in the retail environment 87 to improve retail experiences, and in turn improve sales. Further, the aspect reduces operational costs by improved maintenance of operational components of each merchandiser 10.

Figure 12:
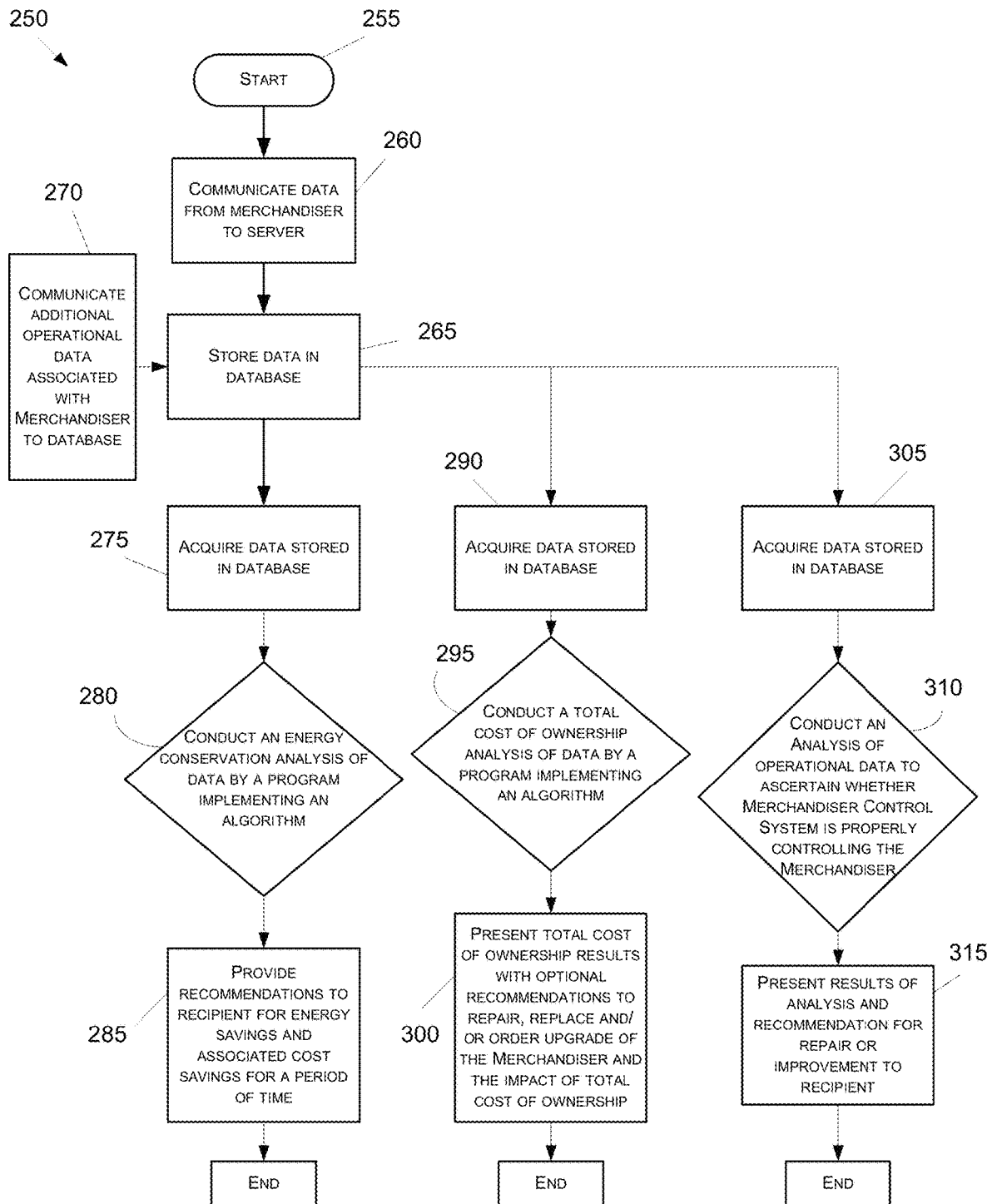
FIG. 12 is a flow chart illustrating an exemplary process for analyzing operational and maintenance data from the merchandiser of FIG. 1 for management of equipment related to the merchandiser.

FIG. 12 depicts another exemplary application in the form of an equipment (or asset) optimization and life cycle management application 250. The application 250 actively manages the life cycle of merchandisers 10 and other assets in the field (e.g. in retail environments or retail settings 87) through data analysis. The application 250 includes a series of processing instructions or steps, which are depicted in a flow chart or a flow diagram form. The application 250 may be stored on the server 89 or on the computer system 130 of the monitoring and managed services center 128. It should be appreciated that the application 250 is also illustrated in a portion of FIG. 6.

The application 250 begins at step 255, at which point the merchandiser 10 is in communication with the server 89, and at least one equipment monitoring sensor 82 associated with the merchandiser 10 is operating and periodically collecting data associated with the merchandiser 10 or components thereof.

Next, at step 260, the control system 70 acquires and communicates data from the equipment monitoring sensor(s) 82 to the database 90. This data and other information is stored in the database 90 at step 265. Examples of the data communicated by the merchandiser 10 and stored in the database 90 are the same as those disclosed in association with step 165 of the application 150.

At step 270, additional operational data and information is communicated to the database 90 for storage. For example, the additional information can include, but is not limited to, repair information regarding merchandisers 10 or components thereof (e.g., chronological information relating to a repair, identification information as to what component was repaired, etc.), replacement information relevant to merchandiser 10 components (e.g., chronological information relating to a replacement, identification information as to what component was replaced, etc.), and operational or control parameters of the merchandiser 10 (e.g., temperature settings, measurement of hydrocarbon refrigerant quantity, amount of time a motor or other components operate, electricity draws for operation of the motor or other components, etc.). The additional operational data and information is collected by the control system 70 associated with the merchandiser 10, which communicates the data and information with the database 90.

Using the data and information stored in the database 90, the application 250 can conduct an analysis to actively manage the merchandiser 10. For example, at step 275, the application 250 communicates with the database 90 to acquire certain data, which may include any desired portion or sub-set of the data in the database 90, up to and including the entirety of the data. Next, at step 280, the application 250 conducts an energy conservation analysis by executing an algorithm by a program or computer-enabled instructions. The energy conservation analysis converts energy usage of the merchandiser 10 into a cost for a period of time (e.g. a monthly or yearly cost of operation), and analyzes operational data in view of operational or control parameters of the merchandiser 10. Based on the analysis, at step 285 the application 250 presents one or more recommendations for energy savings. The recommendations for energy savings can include, but is not limited to, adjustments to operational or control parameters of the merchandiser 10, and recommendations for equipment or component replacement that provides energy savings. These energy conservation measures are then communicated to a recipient, who is the owner, user, or other party responsible for the merchandiser 10 at the retail environment or store, for consideration and implementation.

As another example of additional analysis to actively manage the merchandiser 10, at step 290, the application 250 communicates with the database 90 to acquire certain data, which may include any desired portion or sub-set of the data in the database 90, up to and including the entirety of the data. The data acquired at step 290 is different data than the data acquired at step 275. However, in other embodiments, the data may partially or entirely be the same as the data acquired at step 275. Next, at step 295, the application 250 conducts a total cost of ownership (TCO) analysis, which can include a calculation of estimated energy usage, estimated anticipated maintenance costs, and estimated hydrocarbon refrigerant costs (including replacement of hydrocarbon refrigerant) for a period of time (e.g. a monthly or yearly). In addition, the application 250 provides a sustainability metric that includes a direct impact on global warming based on leaking or inadvertently released hydrocarbon refrigerant, and an indirect impact on global warming based on energy usage by the merchandiser 10. Both the direct and indirect impact sustainability metrics can be provided in a carbon dioxide ($CO_2$) equivalent. Based on the analysis, at step 300 the application 250 presents the total cost of ownership and sustainability metrics for consideration by the recipient. In addition, the application 250 can provide the recipient recommendations for repairs, replacement, and/or an upgrade of the merchandiser 10 and the associated impact on the total cost of ownership and sustainability metrics, allowing the recipient to make an informed and proactive decision regarding reinvestment into the merchandiser 10.

As another example of analysis to actively manage the merchandiser 10, at step 305 the application 250 communicates with the database 90 to acquire certain data, which may include any desired portion or sub-set of the data in the database 90, up to and including the entirety of the data. The data acquired at step 305 is different data than the data acquired at steps 275 or 290. However, in other embodiments, the data may partially or entirely be the same as the data acquired at steps 275 or 290. Next, at step 310, the application 250 conducts an analysis of the operational data to ascertain whether the control system 70 is properly controlling the merchandiser 10. For example, the application 250 can acquire a temperature set point, an actual temperature measurement in the merchandiser 10, and the electricity usage information of the merchandiser 10 for a period of time. By analyzing the temperature set point and actual temperature against a predicted electricity usage or a prior, known electricity usage for the merchandiser 10 at the temperature set point, the application 250 can determine whether control system 70 is properly controlling the merchandiser 10. The application 250 then presents the analysis results to the recipient, along with any recommendations for improvements or repairs (such as repairs to the control system 70 or components thereof, etc.) at step 315.

Figure 13:
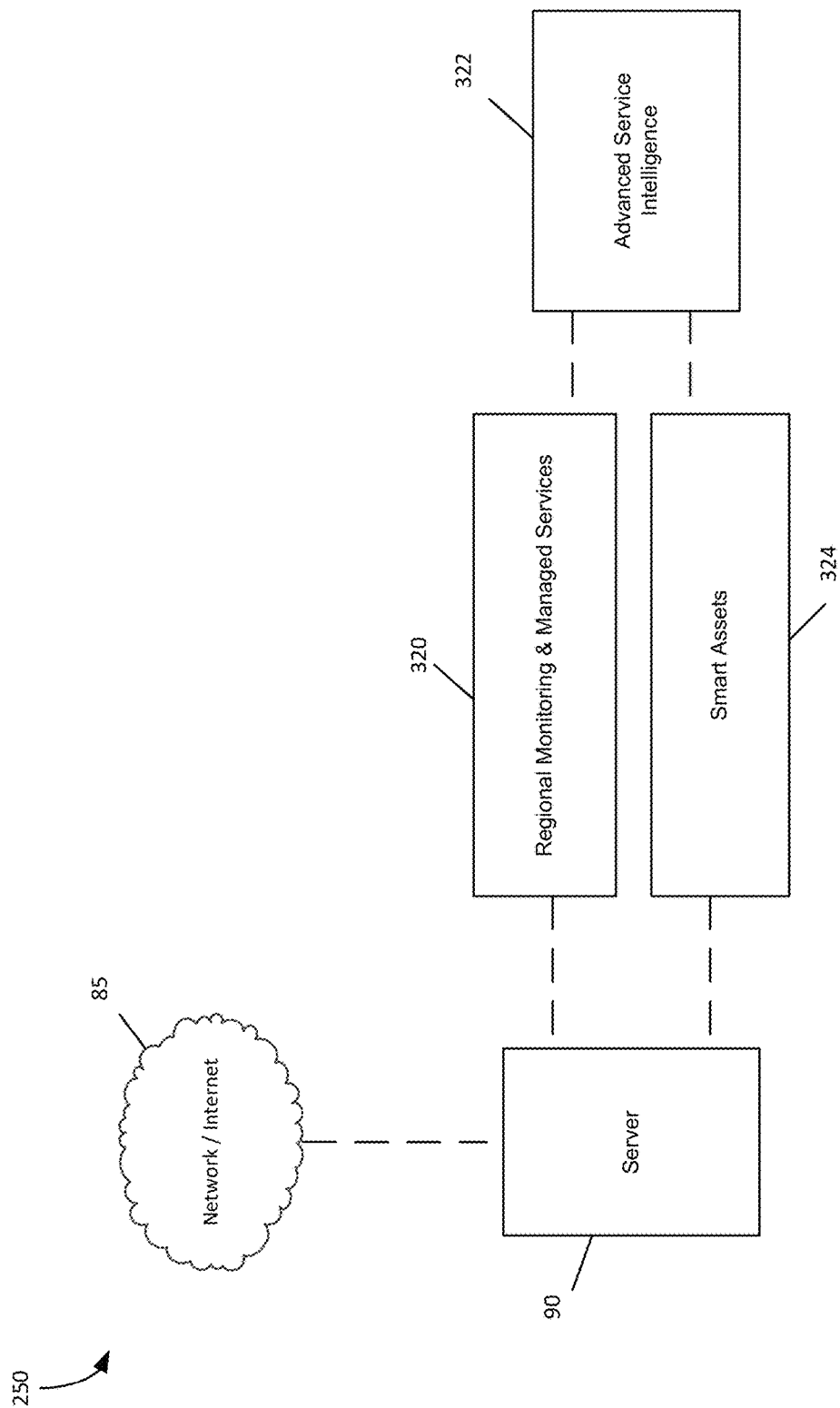
FIG. 13 is a flow chart of certain aspects and advantages of the process of FIG. 12.

FIG. 13 illustrates other examples of the operations and maintenance aspect of the process 250, shown in a flow chart format. The operations and maintenance aspect includes a regional monitoring and managed services portion 320 that is in communication with an advance service intelligence portion 322, and a smart asset portion 324. Each portion 320, 322, 324 is in communication with the network or Internet 85 and the database 90. The regional monitoring and managed services portion 320 centrally monitors merchandisers 10 (and other equipment) across an enterprise, and tracks performance metrics to improve equipment portfolio management. The advanced service intelligence portion 322 provides real-time monitoring of operational (or in-service) merchandisers 10, and provides transparency into the current operational state of theses merchandisers 10. This intelligence improves longevity and operational costs of the merchandisers 10. Further, automation of services and maintenance activities can reduce costly repairs and downtimes, while also notifying service technicians of service needs. The smart asset portion 324 can improve the operations and maintenance associated with the merchandiser 10. The operations and maintenance aspect of the process 250 advantageously improves retail availability by reducing merchandiser 10 downtime. This in turn improves customer satisfaction, and improves product presentation, product quality, and product availability. Further, it reduces product losses through reduced spoilage. The aspect also improves operations of the merchandiser 10, as the process 250 provides visibility into operations, energy consumption, and peak performance. This information in turn can reduce the operational and maintenance costs of the merchandiser 10.

Figure 14:
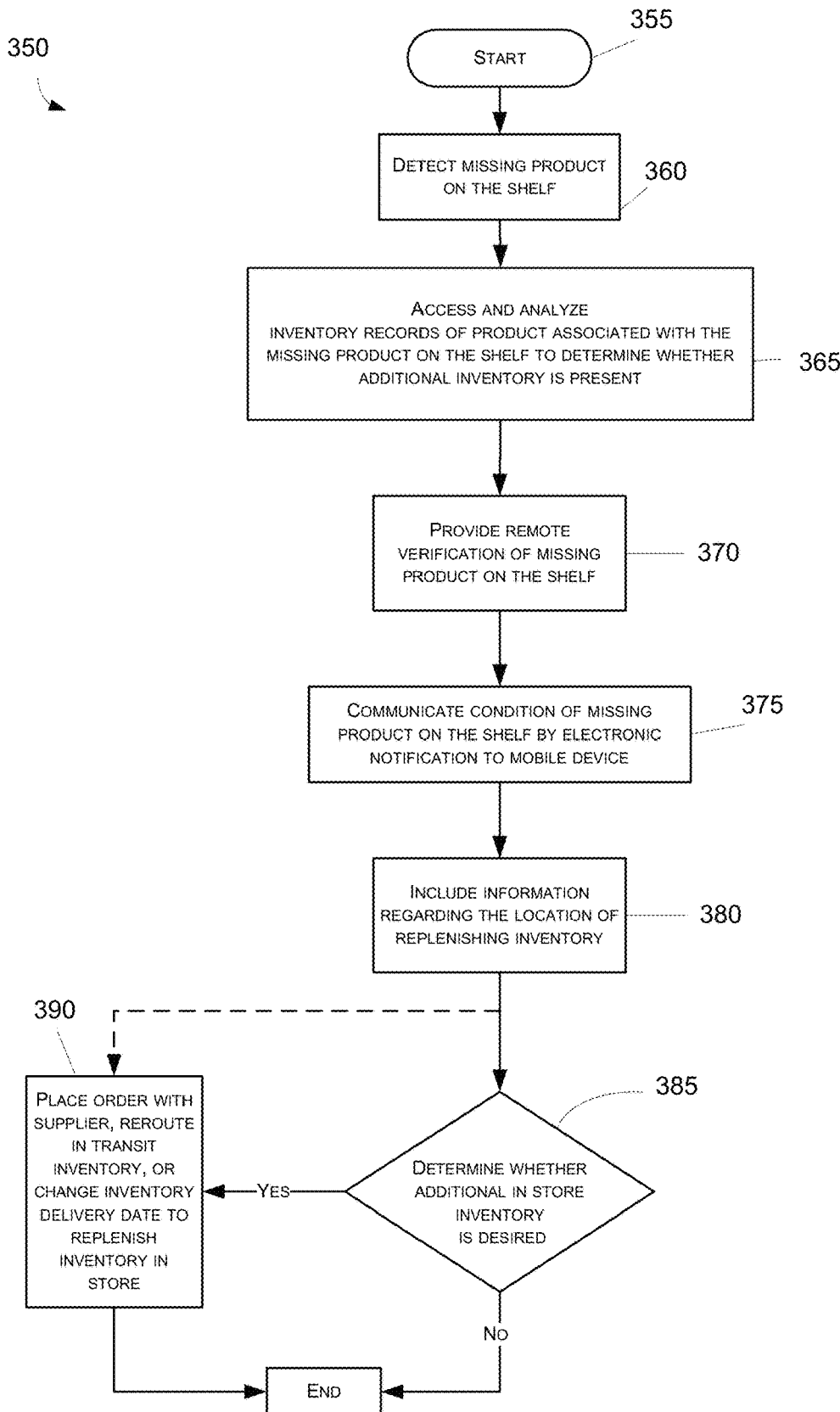
FIG. 14 is a flow chart illustrating an exemplary process for inventory and supply chain management for the merchandiser of FIG. 1.

Referring now to FIG. 14, another exemplary application is depicted in the form of an inventory and supply chain management application 350. The application 350 improves supply chain management by detecting missing, reduced, or depleted inventory on the shelf 65 of the merchandiser 10

(e.g., referred to as a "hole in the shelf"), providing notification to replenish the shelf 65 (or to at least partially refill the shelf), and manage inventory in the store (including reordering of inventory). The application 350 includes a series of processing instructions or steps, which are depicted in a flow chart or a flow diagram form. The application 350 may be stored on the server 89, or stored on the computer system 130 of the monitoring and managed services center 128. It should be appreciated that the application 350 is also illustrated in a portion of FIG. 5.

The application 350 begins at step 355, where the merchandiser 10 is in communication with the server 89, and at least one inventory sensor 80 with the merchandiser 10 is operating and detecting the presence of a product on the shelf 65.

At step 360, product is removed from the shelf 65, creating a hole in the shelf 65. The inventory sensor 80 in the merchandiser 10 detects the missing product on the shelf (e.g., product that is removed by a consumer for purchase, etc.), and communicates the detection to the control system 70.

Next, at step 365, the application 350 accesses electronic product inventory records of the store. The inventory records are preferably stored on the server 89, but can be stored locally at the store. The application analyzes the records to determine whether additional inventory of the product associated with the missing product on the shelf 65 is present in the retail environment 87.

At step 370, the application provides remote verification of the missing product on the shelf 65 (e.g., a photo or live video stream by a camera, or other suitable detection device). This is to provide confirmation of the hole in the shelf and avoid a false detection of the inventory sensor 80. The confirmation is available for remote inspection and verification.

At step 375, an electronic notification communication is sent to a remote device indicating there is a missing product on the shelf condition, providing the location of the shelf 65 in the retail environment 87 that has the missing product condition (e.g. the merchandiser 10 and associated shelf 65), and providing confirmation for remote verification of the missing product condition (e.g., to avoid a false positive). The electronic communication can include, but is not limited to, a text message, email message, an electronic notification associated with a mobile device application, etc. If there is additional inventory available in the store 87 (or in transit to the store 95) to refill the missing product on the shelf, the notification includes information regarding the location of the replenishing inventory (e.g. location in the store, on a truck in route, on a truck being rerouted to the store, in a distribution warehouse, etc.), which is provided at step 380. If there is no additional inventory available (e.g., in the store, nearby, in route, etc.), the notification can include information that there is no replenishing inventory, and the status of the inventory (already reordered, out of stock, etc.). The remote electronic device receiving the communication can be accessed by a recipient, for example, but not limited to, an employee, plurality of employees, or other individual(s) having responsibility to maintain inventory on the shelf having the missing product condition. The remote electronic device can be carried by the recipient (e.g., a tablet, a phone, etc.) for action by the recipient (e.g., the employee replenishes the missing inventory on the shelf).

Next, at step 385, after the employee acquires and replenishes the missing inventory on the shelf (e.g., deploys additional in store inventory), the process analyzes the updated inventory records and determines whether additional in store inventory is desired. If the analysis determines additional in store inventory is desired (i.e. "Yes" at step 385) the process proceeds to step 390. Similarly, if there is no replenishing inventory in the store, the process bypasses the determination of step 385 and proceeds to step 390 (illustrated by a broken line in FIG. 13 from step 380 to step 390).

At step 390, the application 350 takes action to replenish the store inventory. For example, the application 350 can place one or more orders with an appropriate supplier or distributor, reroute inventory that is in transit to the store (or a different store), change an inventory delivery data (e.g., move the delivery date of an existing order to an earlier or later date, etc.). After completion of the action, the process ends. If the analysis at step 385 determines no additional in store inventory is desired (i.e. "No" at step 385) the process ends.

Figure 15:
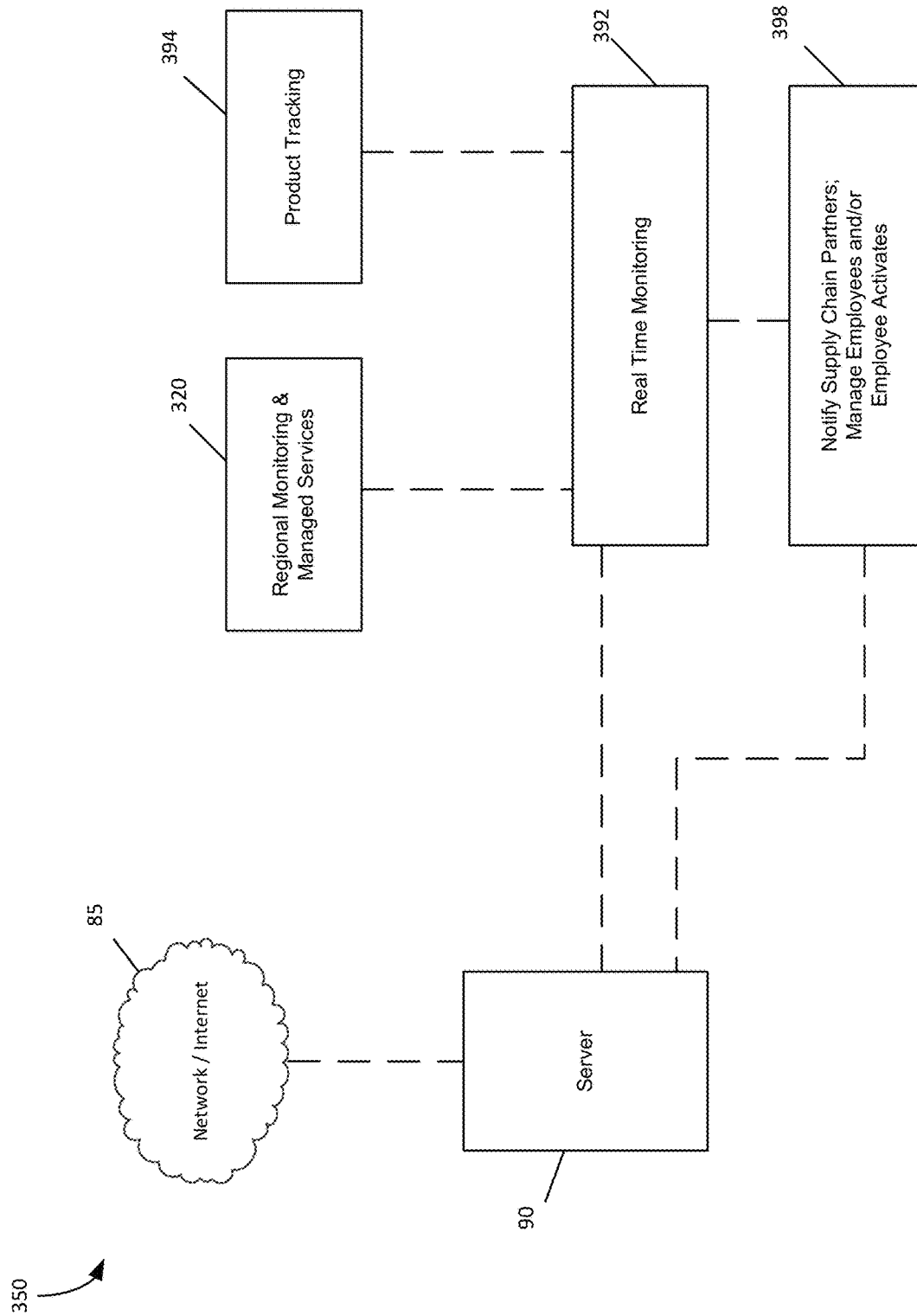
FIG. 15 is a flow chart of certain aspects of the process of FIG. 14.

FIG. 15 illustrates other examples of the supply chain management aspect of the process 350, shown in a flow chart format. The supply chain management aspect includes a real time monitoring portion 392, a product tracking portion 394, and the regional monitoring and managed services portion 320 (from FIG. 13). The real time monitoring portion 392 detects product presence on the merchandiser 10, interactions and consumer presence in association with the merchandiser 10, and consumer travel patterns within the retail environment 87. These interactions and travel patterns quickly identify missing products, which can generate a notification to supply chain partners (e.g., suppliers, etc.) and/or manage store level employees and/or activities to refill or restock the merchandiser 10 at aspect 398. The product tracking aspect 394 differentiates between supply chain errors and misplaced products in a retail environment 87 to locate product. The regional monitoring and managed services portion 320 provides information relating to monetization losses at a territory or region level, while also aggregating supply chain data across different operational levels (e.g., store level, city level, region level, etc.) to provide operational insight and control necessary to manage deviations. The supply chain management aspect of the process 350 can advantageously maintain full shelves on merchandisers 10 by promptly replenishing missing inventory at a shelf and/or store level, which drive sales. In addition, the supply chain management aspect of the process 350 improves customer satisfaction based on desired or needed products being in stock (e.g., on the shelf, in the store, etc.). Further, the supply chain management aspect of the process 350 prioritizes replenishment of missing product based on sales volume and customer traffic patterns, which can both increase profitability and customer satisfaction.

Figure 16:
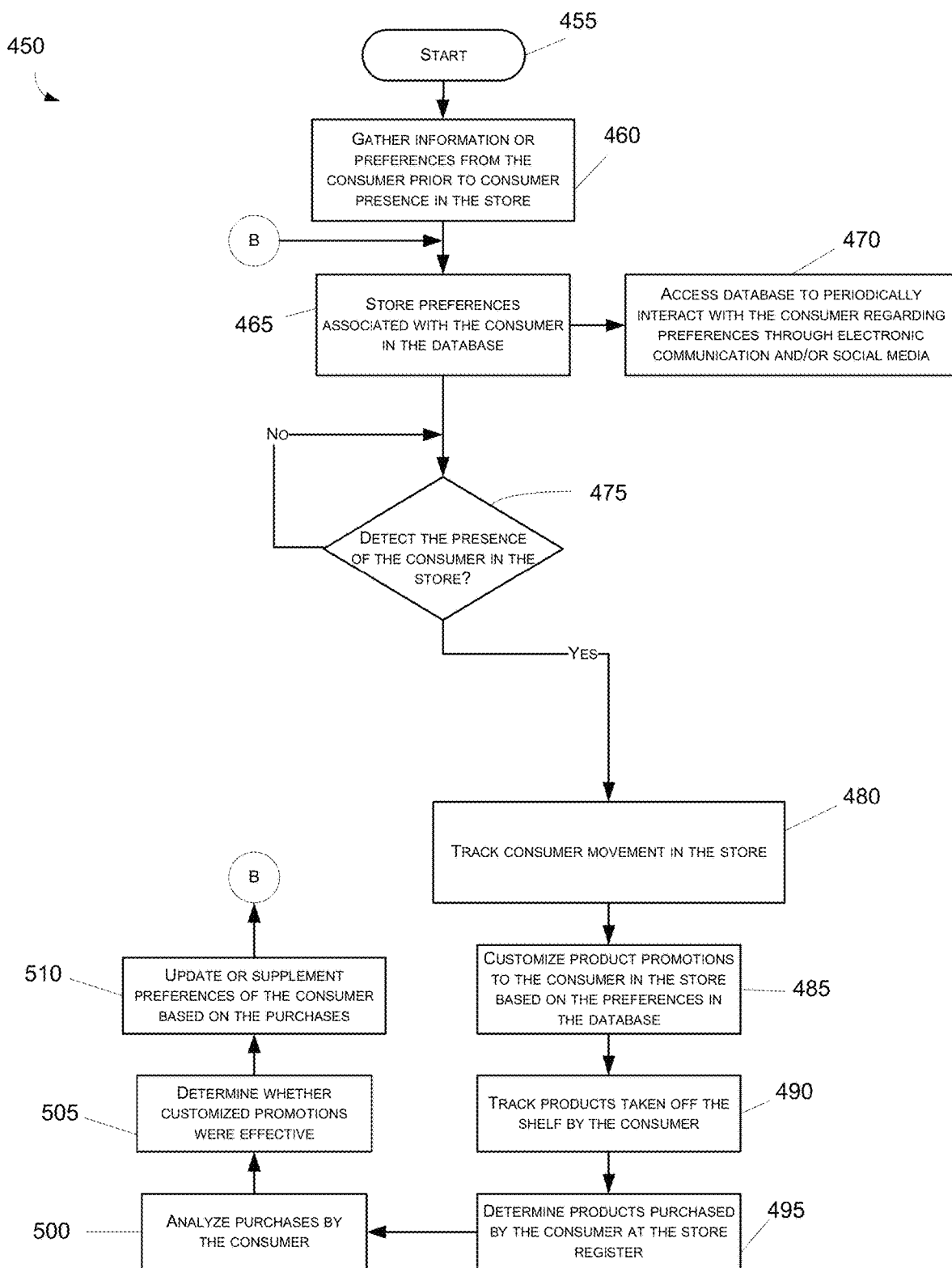
FIG. 16 is a flow chart illustrating an exemplary process for shopper engagement with the merchandiser of FIG. 1.

FIG. 16 depicts another exemplary application in the form of a shopper engagement application 450. The application 450 improves engagement with the shopper or consumer at the point of decision making (e.g., at the merchandiser 10) while customizing information presented to the consumer at the store based on consumer preferences. The application 450 includes a series of processing instructions or steps, which are depicted in a flow chart or a flow diagram form. The application 450 may be stored on the server 89, or stored on the computer system 130 of the monitoring and managed services center 128. It should be appreciated that the application 450 is also illustrated in a portion of FIG. 5.

The application 450 begins at step 455, at the point where the consumer has access to a portal to provide information including consumer preferences. The portal may be provided by electronic communication, for example by the internet, through an electronic communication (email), by a mobile device application, etc.

At step 460, the consumer provides information and preferences through the portal. The information may include personal identification information (e.g. birthday, gender, preferred social media, email address, etc.) and purchasing preferences (e.g. preferred types or categories of products, preferred brands of products, etc.). This information is gathered and simultaneously (or subsequently) stored in the database 90 with the personal identification information of the consumer (i.e., the preferences are tied to the consumer) at step 465.

Next, at step 470, the system periodically accesses the database 90 to interact with the consumer regarding the stored preferences through electronic communication (e.g., email, etc.) and/or the preferred social media (e.g., FACEBOOK®, TWITTER®, etc.). For example, the system may send an email to the consumer indicating that a purchasing preference is on sale (e.g., an email indicating one or more items stored in the database 90 is on sale). As a more detailed example, if the database 90 includes COLGATE® brand toothpaste as a purchasing preference of the consumer, the system can send an email to the consumer indicating COLGATE® brand toothpaste (or a related product) is on sale. As another example, the system may send a direct communication to the consumer by FACEBOOK® indicating a purchasing preference is on sale.

At step 470, the system detects the presence of the consumer in the store at step 475. For example, the system uses a wireless connection (e.g., a connection such as Bluetooth, ANT+, NFC, ZigBee, Z-Wave, GPS, etc.) in the store (or from a beacon associated with the merchandiser 10) to detect or otherwise communicate with an application downloaded to a mobile device (e.g., cell phone, tablet, etc.) by the consumer. If the system does not detect the consumer (i.e. "No" at step 475), step 475 is repeated until the system detects the presence of the consumer. Upon detecting the presence of a consumer (i.e. "Yes" at step 475), the process proceeds to step 480.

At step 480, the system initiates tracking of consumer movement in the store. For example, the system uses the wireless connection with the consumer's mobile device to track the consumer in the store (e.g., via Bluetooth, etc.), such as with one or more wireless beacons positioned in the store.

Next, at step 485, the system initiates customized product promotions for the consumer based on the consumer's purchasing preferences. For example, the store may include one or more kiosks or displays that provide audio, verbal, or visual (e.g., video) information. As the consumer approaches the kiosk, the system presents a customized advertisement or product information on the kiosk (e.g., location of certain items or brands within the store, etc.) relating to the consumer's purchasing preferences. Proximity of the consumer's mobile device relative to the kiosk may trigger the kiosk to present the relevant information. For example, to trigger the connection, the kiosk can send a communication to the mobile device, or the mobile device can send a communication to the kiosk.

In another example, the merchandiser 10 can provide visual information, such as colored lights, flashing lights, or messages (e.g., on a user or consumer device such as a smartphone) that direct the consumer to one or more products in the merchandiser 10 associated with the consumer's purchasing preferences. A similar proximity connection with the consumer's mobile device may trigger the merchandiser 10.

In yet another example, the customized advertisement or product information can be presented on a device associated with the merchandiser 10 (e.g., a display or screen attached to, mounted on, or mounted proximate to and in communication with the merchandiser 10, etc.), the consumer's mobile device, and/or a display integrated into the merchandiser 10 (e.g., a digital display on the merchandiser 10 presenting customized product pricing of product on the shelf, the product pricing being adjustable in response to detection of the consumer or the consumer's mobile device, etc.). Examples of additional visual information provided by the merchandiser 10 are disclosed in the patents and patent applications listed and incorporated by reference in this written description (above).

It should be appreciated that steps 475 to 485 as discussed above can be implemented in response to the application 450 (e.g., the application detects the consumer in the store at step 475), or in response to a request by the consumer. For example, at step 475 the consumer can interact with the application 450, such as by submitting a query (or question) to the application 450 through the consumer's mobile device (e.g., inquire as to a location of an item in the store, inquire as to a location of a sale item, etc.). The beacon (e.g., a Bluetooth beacon or other suitable wireless connection beacon), can establish communication with the consumer's mobile device, detect the location of the consumer in the store, and then provide a response to the consumer with regard to the query. A response can include, for example, audio or visual instructions as to the location of the queried item (e.g., provide an aisle and case location, etc.), or directions to the queried item based on the position (or location) of the consumer in the store. The response can be provided to the consumer on one or more of the consumer's mobile device, the merchandiser (e.g., a video display, lights, or other suitable audio, video, and/or visual display), one or more kiosks in the store, or any other associated communication device with the consumer. The application 450 can continue to track consumer movement at step 480, and further provide customized promotions at step 485 concurrently with the consumer interacting with the application 450.

At step 490, the system tracks products the consumer removes from the shelf. For example, based on the location information of the consumer acquired during the consumer tracking step 480, and the inventory sensor 80 in the merchandiser 10, the system identifies and tracks the product(s) the consumer removes from the merchandiser. The system verifies the products taken by the consumer at step 495, where the system determines what products the consumer purchases at the store register. For example, the location information of the consumer in the store indicates when the consumer is at the register. The system connects products scanned at the register with the consumer, and uses the listing of products to develop additional information regarding the purchasing patterns of the consumer. The listing of products and consumer identification information may be stored in the database 90.

Next, the system analyzes the purchases by the consumer at step 500. The analysis includes identifying products the consumer purchased that fall within the consumer's purchasing preferences, along with products (or categories of products) that the consumer regularly purchases (e.g., products and/or brands that the consumer purchases consistently over a period of time as determined by analyzing the purchasing trends of the consumer based on information stored in the database 90). The system also determines whether any customized promotions were effective in step

505. For example, the system determines whether any products that were subject to a customized product promotion (in step 485) were purchased by consumer. In step 510, the system updates or supplements the consumer's purchasing preferences by incorporating the results of the purchasing analysis in step 500, and the effectiveness of the customized product promotions determined in step 505. This provides a continual update of the consumer's purchasing preferences, allowing for relevant customized product promotions for the consumer and improved consumer engagement. The process then returns to step 465 to store the updated or supplemented consumer purchasing preferences in the database 90, and the process repeats.

Figure 17:
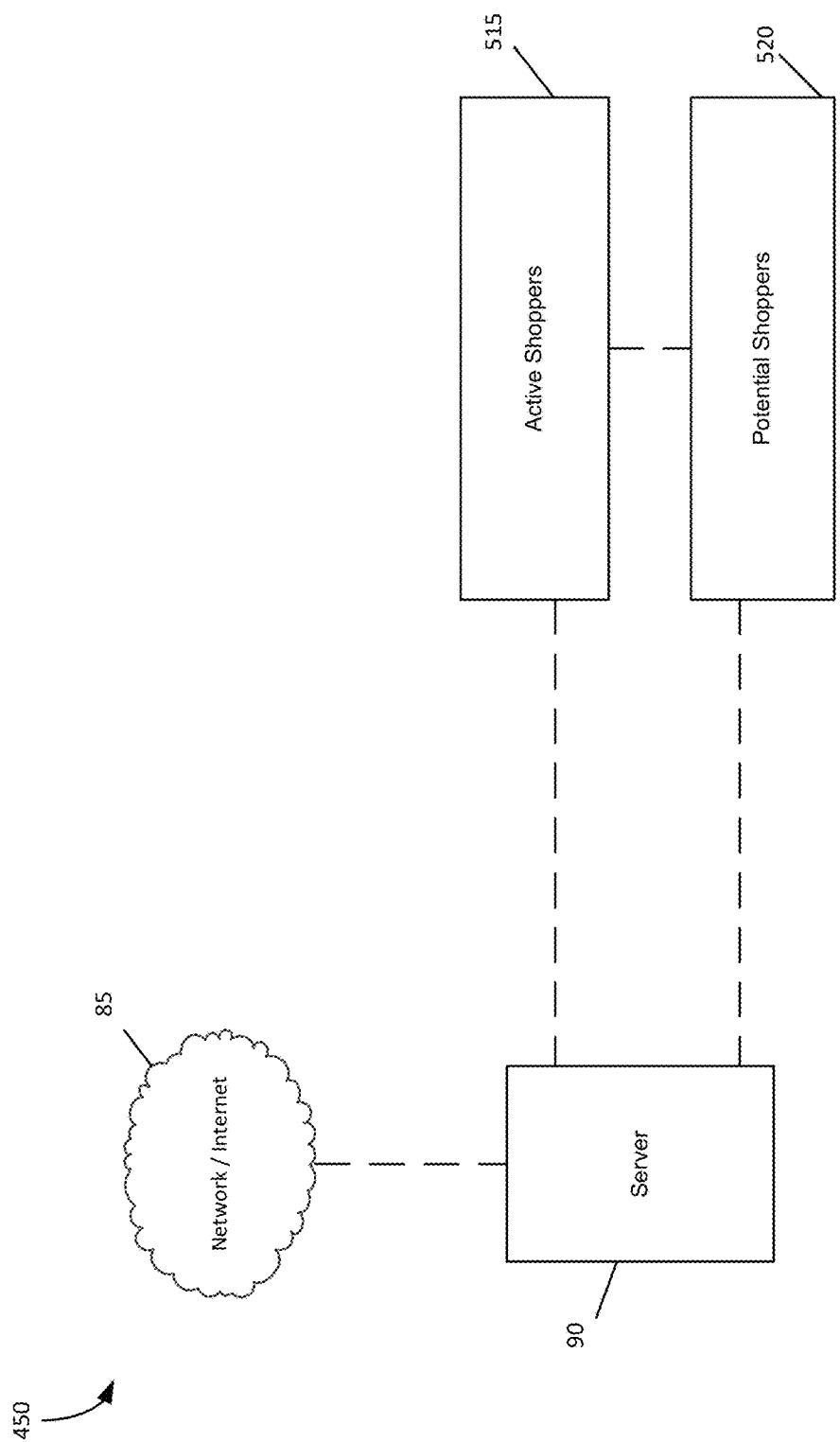
FIG. 17 is a flow chart of certain aspects of the process of FIG. 16.

FIG. 17 illustrates other examples of the shopper engagement aspect of the process 450, shown in a flow chart format. The shopper engagement aspect includes an active shopper portion 515 and a potential shopper portion 520. The active shopper portion 515 detects a customer's presence in a retail environment 87 to customize a retail experience, provides customized promotions at the shelf (or merchandiser 10), and personalized promotions throughout the retail environment 87 by integrated video and/or kiosks. This individually shapes the in-store customer experience based on customer population, while also collects customer presence data through the store (e.g., customer telemetry, travel patterns, etc.) to track promotion effectiveness. In addition, the active shopper portion 515 tracks product data through the store (e.g., product telemetry, product movement, etc.) at the shelf (or merchandiser 10), at the register, and/or through a digital application. This product tracking provides data on promotion effectiveness on sales, while also closing the loop on shopper engagement as it can generate targeted promotions in the future. The potential shopper portion 520 provides for latent engagement of customers (or potential customers) at home to encourage entering the retail environment 87 (e.g., by online advertisements, data acquisition, etc.). The portion 520 also engages active customers located near (but not in) the retail environment 87 at with product promotions to encourage or motivate customers to enter the retail environment 87. The shopper engagement aspect of the process 450 can advantageously provide multi-channel engagement with customers (or potential customers) through continuous promotion and engagement cycles before, during, and after entering the retail environment 87 to reinforce buying decisions. The aspect also improves the effectiveness of the retail experience through customized, dynamic interactions with customers. These interactions improve customer satisfaction, ease the shopping process, and provide continuous refreshes of the retail environment 87. The aspect also advantageously provides data, and an understanding of promotions, presences, product movement, and shopper psychology to increase a shopper's purchase volume and associated spend.

Various features and advantages of the invention are set forth in the following claims.

The invention claimed is:

1. An equipment monitoring system for a merchandiser including a product display, the equipment monitoring system comprising:
   a control system defining a data acquisition node and having a microprocessor and a communication link, the control system configured to be in communicably coupled to the merchandiser;
   a server in remote communication with the control system via a network providing a communication bridge between the data acquisition node and the server, the server including a database configured to store data communicated from the data acquisition node via the network, and one or more applications having executable processing instructions;
   equipment monitoring sensors configured to be coupled to one or more components of the merchandiser and to obtain status data regarding the status of the one or more components, the equipment monitoring sensors in communication with the data acquisition node via the communication link to communicate the status data to the server; and
   wherein the one or more applications are programmed to execute processing instructions configured to conduct program analysis for the one or more components using the status data based on real time information and historical information associated with the merchandiser to determine a predictive component failure associated with the one or more components, and
   wherein the equipment monitoring sensors include at least two of
      a power usage monitor, wherein the status data includes power usage of the one or more components and the program analysis determines whether the power usage is outside of a set limit to determine the predictive component failure associated with power usage,
      a door sensor, wherein the status data includes door usage data and the program analysis determines the predictive component failure associated with a door, and
      an accelerometer, wherein the status data includes motor vibration data and the program analysis determines the predictive component failure associated with a motor.

2. The equipment monitoring system of claim 1, wherein the status data further includes chronological information and component identification information.

3. The equipment monitoring system of claim 1, wherein the program analysis is further configured to monitor one or more of the equipment monitoring sensors to detect the existence of an out-of-limit condition associated with the one or more of the equipment monitoring sensors being monitored.

4. The equipment monitoring system of claim 3, wherein the one or more applications are further programmed to analyze another of the equipment monitoring sensors to determine whether the out-of-limit condition is due to normal use, a potential equipment failure, or an existing equipment failure.

5. The equipment monitoring system of claim 1, wherein the one or more applications are programmed to execute additional processing instructions configured to:
   generate and send electronic correspondence from the application to an electronic device upon the program analysis predicting a failure of the one or more components, the electronic correspondence identifying the predicted failure, a recommended repair or replacement, and providing an interactive scheduling selector;
   identify via the one or more applications an appropriate service technician once a recipient accesses the interactive scheduling selector by the electronic device;
   present via the electronic correspondence scheduling options to the recipient by the electronic device; and
   schedule the service technician via the one or more applications in response to the recipient selecting a desired scheduling option by the electronic device.

6. The equipment monitoring system of claim 5, wherein the one or more applications are programmed to execute additional processing instructions configured to:
  determine via the one or more applications the availability of a replacement for the at least one component in response to the recipient accessing the interactive scheduling selector by the electronic device; and
  order a replacement for the at least one component via the one or more applications in response to a determination that a replacement for the at least one component is unavailable in a local storage facility.

7. The equipment monitoring system of claim 1, wherein the door usage data includes number of times and duration one or more doors are open or closed.

8. The equipment monitoring system of claim 1, wherein the equipment monitoring sensors include a pressure sensor and a temperature sensor associated with a refrigeration system of the product display and the status data includes pressure data and temperature data, and wherein the program analysis determines a predictive refrigeration system failure.

9. The equipment monitoring system of claim 1, wherein the equipment monitoring sensors include a fan sensor and the status data includes fan operation data, and wherein the program analysis determines a predictive fan failure.

10. The equipment monitoring system of claim 1, wherein the equipment monitoring sensors include a defrost sensor and the status data includes defrost operation data, and wherein the program analysis determines a predictive defrost failure.

11. A method of monitoring equipment associated with a merchandiser including a product display, the method comprising:
  obtaining status data associated with one or more components of the merchandiser with equipment monitoring sensors;
  transmitting the status data between the equipment monitoring sensors and a data acquisition node of a control system of the merchandiser via a communication link, the control system in remote communication with a server via a network, the server including a database configured to store data communicated from the data acquisition node via the network, and one or more applications having executable processing instructions; and
  running the one or more applications to execute processing instructions including:
    executing processing instructions to conduct program analysis for the one or more components using the status data based on real time information and historical information associated with the merchandiser to determine a predictive component failure associated with the one or more components,
  wherein the equipment monitoring sensors include at least two of
    a power usage monitor, wherein the status data includes power usage of the one or more components and the program analysis determines whether the power usage is outside of a set limit to determine the predictive component failure associated with power usage,
    a door sensor, wherein the status data includes door usage data and the program analysis determines the predictive component failure associated with a door, and
    an accelerometer, wherein the status data includes motor vibration data and the program analysis determines the predictive component failure associated with a motor.

12. The method of claim 11, further comprising:
generating and sending electronic correspondence from the application to an electronic device upon the program analysis predicting a failure of the one or more components, the electronic correspondence identifying the predicted failure, a recommended repair or replacement, and providing an interactive scheduling selector;
identifying via the one or more applications an appropriate service technician once a recipient accesses the interactive scheduling selector by the electronic device;
presenting via the electronic correspondence scheduling options to the recipient by the electronic device; and
scheduling the service technician via the one or more applications in response to the recipient selecting a desired scheduling option by the electronic device.

13. The method of claim 12, further comprising:
determining via the one or more applications the availability of a replacement for the one or more components in response to the recipient accessing the interactive scheduling selector by the electronic device; and
ordering a replacement for the one or more components via the one or more applications in response to a determination that a replacement for the at least one component is unavailable in a local storage.

14. The method of claim 11, wherein the status data further includes chronological information and component identification information.

15. The method of claim 11, further comprising monitoring, via the program analysis, one or more of the equipment monitoring sensors to detect the existence of an out-of-limit condition associated with the one or more of the equipment monitoring sensors being monitored.

16. The method of claim 15, further comprising analyzing, via the program analysis, another of the equipment monitoring sensors and determining whether the out-of-limit condition is due to normal use, a potential equipment failure, or an existing equipment failure.

* * * * *